United States Patent

Suzuki et al.

(10) Patent No.: US 10,339,785 B2
(45) Date of Patent: Jul. 2, 2019

(54) FAILURE DIAGNOSIS SYSTEM

(71) Applicant: SUMITOMO HEAVY INDUSTRIES, LTD., Tokyo (JP)

(72) Inventors: Kota Suzuki, Aichi (JP); Mikio Komatsu, Aichi (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/908,582

(22) Filed: Feb. 28, 2018

(65) Prior Publication Data

US 2018/0286212 A1   Oct. 4, 2018

(30) Foreign Application Priority Data

Mar. 31, 2017  (JP) .................... 2017-071302

(51) Int. Cl.
G08B 21/00 (2006.01)
G08B 21/18 (2006.01)
G05B 19/418 (2006.01)
G05B 23/02 (2006.01)

(52) U.S. Cl.
CPC ....... *G08B 21/187* (2013.01); *G05B 19/4184* (2013.01); *G05B 23/0267* (2013.01); *G05B 23/0213* (2013.01); *G05B 23/0235* (2013.01); *G05B 2219/37209* (2013.01); *G05B 2219/49197* (2013.01)

(58) Field of Classification Search
CPC .. G08B 21/187; G05B 23/00; G05B 19/4184; G05B 23/0267; G05B 23/0213; G05B 23/0235; G05B 2219/37209; G05B 2219/49197

USPC ........................................ 340/679
See application file for complete search history.

(56) References Cited

U.S. PATENT DOCUMENTS

| 6,777,901 B2* | 8/2004 | Susono | H02K 7/116 180/65.1 |
| 9,036,209 B2* | 5/2015 | Holub | G06F 3/1267 358/2.1 |
| 9,075,410 B2* | 7/2015 | Ohkado | G06F 21/552 |
| 10,185,310 B2* | 1/2019 | Jauquet | G05B 19/4183 |

(Continued)

FOREIGN PATENT DOCUMENTS

JP   2003-088178 A   3/2003

*Primary Examiner* — Kerri L McNally
*Assistant Examiner* — Thang D Tran
(74) *Attorney, Agent, or Firm* — Michael Best & Friedrich LLP

(57) ABSTRACT

A failure diagnosis system includes: a sensor; an abnormality determination unit that determines whether an abnormality occurs in a diagnosis target device corresponding to the sensor on the basis of diagnosis target information detected by the sensor; a screen display controller that identifiably notifies a diagnosis target device for which it is determined by the abnormality determination unit that the abnormality occurs; a layout setting unit that sets a facility layout of a facility; and a disposition setting unit that sets a disposition of each diagnosis target device in the facility layout. The screen display controller identifiably notifies a diagnosis target device associated with a sensor that detects diagnosis target information that is a basis of the determination that the abnormality occurs, in a disposition screen display region 521 in which diagnosis information acquisition units are disposed on the facility layout.

15 Claims, 14 Drawing Sheets

(56) References Cited

U.S. PATENT DOCUMENTS

| | | | | |
|---|---|---|---|---|
| 2001/0048375 | A1* | 12/2001 | Maruyama | H01H 1/0015 340/870.11 |
| 2002/0013635 | A1* | 1/2002 | Gotou | G01M 13/045 700/108 |
| 2002/0128728 | A1* | 9/2002 | Murakami | G05B 23/0245 700/10 |
| 2004/0186694 | A1* | 9/2004 | Oya | G03G 15/5075 702/188 |
| 2005/0240289 | A1* | 10/2005 | Hoyte | G05B 23/0294 700/49 |
| 2007/0118333 | A1* | 5/2007 | Miyasaka | B61F 15/20 702/183 |
| 2008/0306650 | A1* | 12/2008 | Nakagaki | G05B 23/0264 701/33.4 |
| 2009/0201315 | A1* | 8/2009 | Nishida | B60K 35/00 345/634 |
| 2010/0161175 | A1* | 6/2010 | Yamada | E02F 9/26 701/33.4 |
| 2012/0048396 | A1* | 3/2012 | Takemoto | F15B 19/005 137/487.5 |
| 2012/0232806 | A1* | 9/2012 | Srinivasan | G05B 23/0264 702/33 |
| 2012/0256768 | A1* | 10/2012 | Kratchounova | G01C 23/00 340/973 |
| 2012/0290323 | A1* | 11/2012 | Barsoum | G16H 15/00 705/3 |
| 2013/0345897 | A1* | 12/2013 | Sakuma | G06F 17/00 701/1 |
| 2014/0266755 | A1* | 9/2014 | Arensmeier | G05B 15/02 340/679 |
| 2015/0049851 | A1* | 2/2015 | Yokoyama | G21D 3/001 376/217 |
| 2015/0066286 | A1* | 3/2015 | Connolly | G06Q 10/00 701/29.6 |
| 2015/0167461 | A1* | 6/2015 | Sugihara | G06Q 50/02 299/1.05 |
| 2017/0017232 | A1* | 1/2017 | Nishiuchi | G05B 23/0256 |
| 2017/0094244 | A1* | 3/2017 | Karasudani | G06T 19/006 |
| 2017/0131705 | A1* | 5/2017 | Ishii | G05B 19/4184 |
| 2017/0140287 | A1* | 5/2017 | Moriyama | G05B 13/04 |
| 2017/0178498 | A1* | 6/2017 | Mcerlean | B60K 35/00 |
| 2017/0220162 | A1* | 8/2017 | Ko | G06F 3/0412 |
| 2017/0261403 | A1* | 9/2017 | Hiruta | G01M 15/14 |
| 2017/0269811 | A1* | 9/2017 | Tsujimura | G06F 3/04817 |
| 2017/0273249 | A1* | 9/2017 | Takeuchi | A01G 7/00 |
| 2017/0350823 | A1* | 12/2017 | Kelly | G01N 21/783 |
| 2018/0011480 | A1* | 1/2018 | Hiruta | G05B 23/0227 |

* cited by examiner

FIG. 12

571 → PROCESSING UNIT ASSOCIATION

| PROCESSING UNIT No | PROCESSING UNIT NAME | IP ADDRESS |
|---|---|---|
| 01 | PROCESSING UNIT 200a | 192.168.X.X |
| 02 | PROCESSING UNIT 200b | 192.168.X.X |
| 03 | PROCESSING UNIT 200c | 192.168.X.X |

581 → SENSOR ASSOCIATION

| SENSOR NAME | PROCESSING UNIT No | PROCESSING UNIT NAME | ch |
|---|---|---|---|
| SENSOR 100a | 1 | PROCESSING UNIT 200a | 1 |
| SENSOR 100b | 2 | PROCESSING UNIT 200b | 1 |
| SENSOR 100c | 3 | PROCESSING UNIT 200c | 1 |
| SENSOR 100d | 3 | PROCESSING UNIT 200c | 2 |
| SENSOR 100e | 3 | PROCESSING UNIT 200c | 3 |
| SENSOR 100f | 3 | PROCESSING UNIT 200c | 4 |
| SENSOR 100g | 3 | PROCESSING UNIT 200c | 5 |

580

FAILURE DIAGNOSIS SYSTEM

RELATED APPLICATIONS

Priority is claimed to Japanese Patent Application No. 2017-071302, filed Mar. 31, 2017, the entire content of which is incorporated herein by reference.

BACKGROUND

Technical Field

Certain embodiments of the present invention relate to a failure diagnosis system.

Description of Related Art

A failure diagnosis system for detecting failure of a device such as a motor, a gear motor, or a gear box, for example, is known. The failure diagnosis system generally includes a sensor that is disposed in a diagnosis target device, and a processing unit that determines whether an abnormality occurs in the diagnosis target device on the basis of information from the sensor.

SUMMARY

According to an embodiment of the present invention, there is provided a failure diagnosis system including: a sensor that is provided with respect to each of a plurality of diagnosis target devices and detects diagnosis target information on a corresponding diagnosis target device; an abnormality determination unit that determines whether an abnormality occurs in the diagnosis target device corresponding to the sensor on the basis of the diagnosis target information detected by the sensor; a notification unit that identifiably notifies a diagnosis target device for which it is determined by the abnormality determination unit that the abnormality occurs; and a setting unit. The setting unit includes a layout setting unit that sets a facility layout of a facility in which the diagnosis target devices are disposed, a disposition setting unit that sets a disposition of each diagnosis target device in the facility layout, and an association setting unit that sets association between each diagnosis target device disposed on the facility layout and sensor identification information for identifying each sensor. The notification unit identifiably notifies a diagnosis target device associated with a sensor that detects diagnosis target information that is a basis of the determination that the abnormality occurs, in a disposition screen in which the respective diagnosis target devices are disposed on the facility layout.

BRIEF DESCRIPTION OF THE DRAWINGS

FIG. 12 is a diagram showing a processing unit association screen.
FIG. 13 is a diagram showing a sensor association screen.

DETAILED DESCRIPTION

Figure 1:
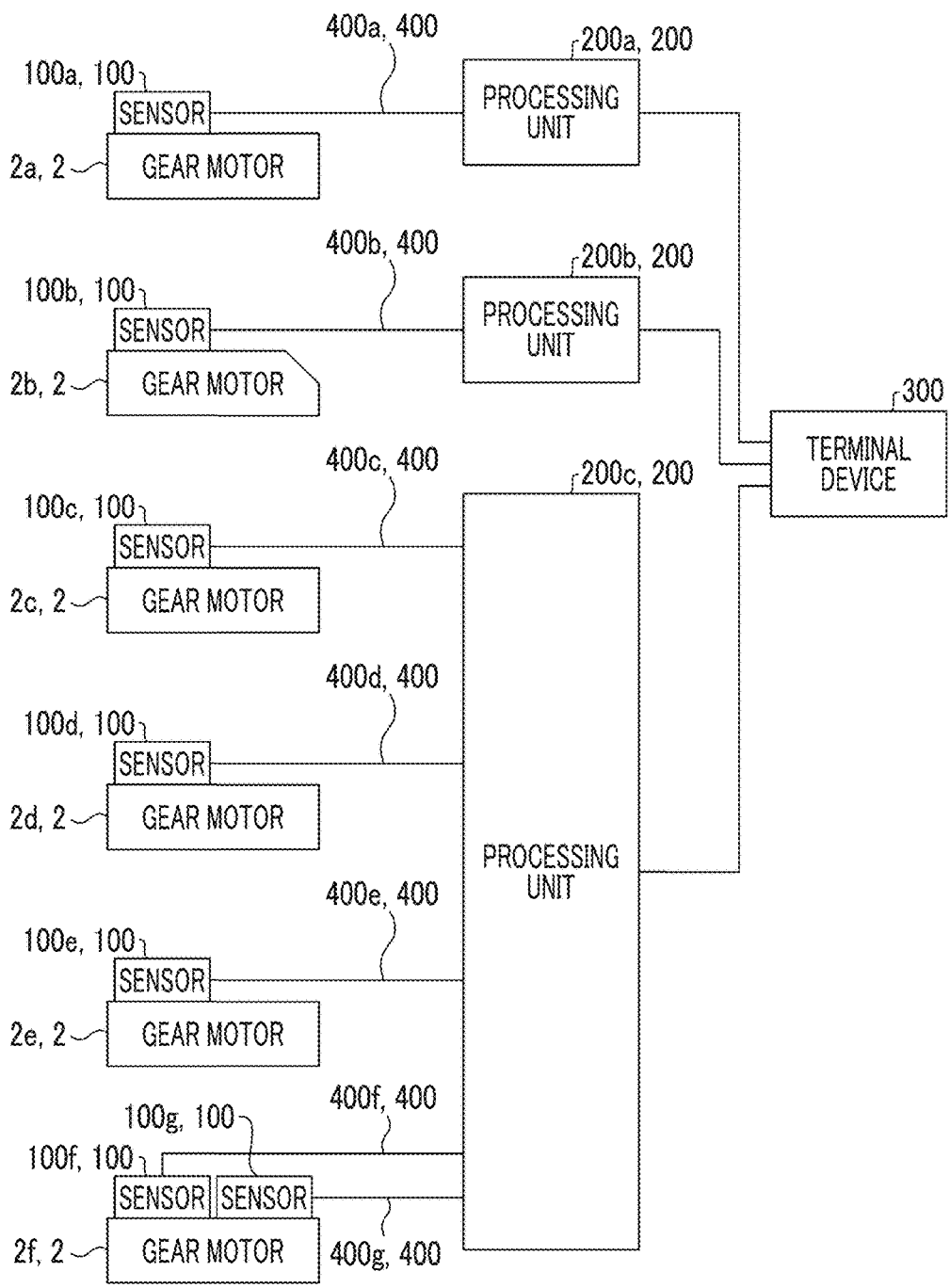
FIG. 1 is a schematic view showing a configuration of a failure diagnosis system according to an embodiment.

There is a need for providing a failure diagnosis system capable of easily identifying, in a case where a plurality of diagnosis target devices is disposed in a facility, a diagnosis target device in which an abnormality occurs.

Arbitrary combinations of the above-mentioned components and exchanges, between methods, apparatuses and systems, of the components or expressions of the invention are also effective as embodiments of the invention.

According to the invention, it is possible to provide a failure diagnosis system capable of easily identifying, in a case where a plurality of diagnosis target devices is disposed in a facility, a diagnosis target device in which an abnormality occurs.

Hereinafter, the same reference numerals are given to the same or equivalent components, members, and processes shown in respective drawings, and repetition of description will be appropriately avoided. Further, dimensions of the members in the respective drawings are appropriately enlarged or reduced for ease of understanding. In addition, in description of embodiments in the respective drawings, a part of unimportant members are not shown.

FIG. 1 is a schematic view showing a configuration of a failure diagnosis system 10 according to an embodiment. The failure diagnosis system 10 detects an abnormality of gear motors 2a to 2f that are generally referred to as gear motors 2, and supports analysis thereof. The failure diagnosis system 10 may be used for detecting an abnormality of a diagnosis target device other than the gear motor, such as a chain sprocket, an injection molding machine, a machine tool, an industrial robot, or the like, for example.

The failure diagnosis system 10 includes sensors 100a to 100g that are generally referred to as sensors 100, processing units 200a to 200c that are generally referred to as processing units 200, and a terminal device 300. The sensors 100a to 100g and the processing units 200 are connected to each other by cables 400a to 400g that are generally referred to as cables 400. The sensors 100a to 100g and the processing units 200 may be connected to each other in a wireless manner. The processing units 200 and the terminal device 300 may be connected to each other in a wired or wireless manner.

The sensors 100a to 100e are attached to the gear motors 2a to 2e, respectively. Further, the sensors 100f and 100g are attached to the gear motor 2f. The number of the sensors 100 attached to the gear motors 2 is not particularly limited.

The sensors 100a and 100b are respectively connected to the processing units 200a and 200b. The sensors 100c to 100g are connected to the processing unit 200c. The number of the sensors 100 connected to the respective processing units 200 may be in a range of the number of sensor connection channels of the respective processing units 200, which is not particularly limited.

The sensor 100 is a vibration sensor in the present embodiment, and detects vibration that occurs in a gear motor 2 to which the sensor is attached (that is, corresponds), generates vibration information indicating the magnitude of the vibration (diagnosis target information), and transmits the result to the processing unit 200. An attachment position of the sensor 100 in the gear motor 2 may be set by determining a position suitable for detection of an abnormality through an experiment, a simulation, or the like.

The processing unit 200 repeatedly executes a "diagnosis process" of determining whether an abnormality occurs in the gear motor 2 on the basis of vibration information transmitted from each sensor 100, and transmits a determination result to the terminal device 300. Further, the processing unit 200 transmits the vibration information transmitted from the sensor 100 to the terminal device 300, in accordance with a "transmission request" of the vibration information received from the terminal device 300.

The terminal device 300 is an information processing device that is operated by a user. The terminal device 300 displays various screens on a predetermined display unit. For example, the terminal device 300 displays a screen indicating a determination result of a diagnosis process in the processing unit 200 on the display unit. The user can understand that an abnormality occurs in the gear motor 2 by confirming the determination result displayed on the display unit.

Figure 2:
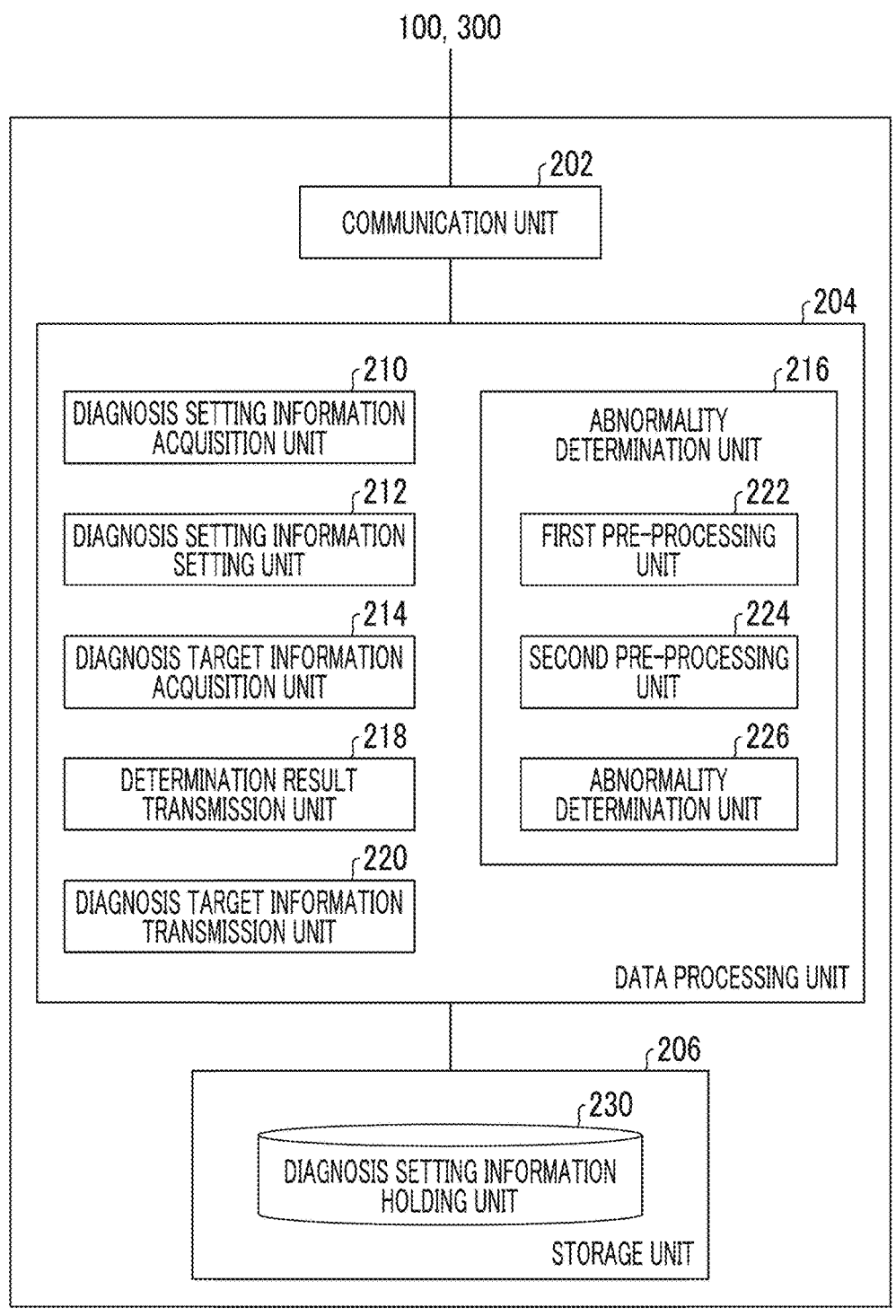
FIG. 2 is a block diagram showing functions and a configuration of a processing unit in FIG. 1.

FIG. 2 is a block diagram showing functions and a configuration of the processing unit 200. The respective blocks may be realized by elements such as a CPU and a memory of a computer, or a mechanical device in the form of hardware, and may be realized by a computer program or the like in the form of software, in which functional blocks realized through cooperation therebetween are shown. Accordingly, it is obvious for those skilled in the art that the functional blocks can be realized in various forms by combination of hardware and software. This is similarly applied to the following block diagrams.

The processing unit 200 includes a communication unit 202, a data processing unit 204, and a storage unit 206.

The communication unit 202 executes a communication process between the sensor 100 and the terminal device 300 according to various communication protocols. For example, the data processing unit 204 transmits or receives data to or from the terminal device 300 through the communication unit 202.

The storage unit 206 is a storage region that stores data that is referenced and updated by the data processing unit 204. The storage unit 206 includes a diagnosis setting information holding unit 230. The diagnosis setting information holding unit 230 holds setting information relating to a diagnosis process (hereinafter, referred to as "diagnosis setting information). The diagnosis setting information corresponds to a variety of setting information input to a diagnosis setting screen 500 in FIG. 4 (which will be described later), and for example, includes a diagnosis processing interval, a sampling frequency, a measurement time, a cable length, or the like.

The storage unit 206 is a storage region that stores data that is referenced and updated by the data processing unit 204. The storage unit 206 includes a diagnosis setting information holding unit 230. The diagnosis setting information holding unit 230 holds setting information relating to a diagnosis process (hereinafter, referred to as "diagnosis setting information). The diagnosis setting information corresponds to a variety of setting information input to a diagnosis setting screen 500 in FIG. 4 (which will be described later), and for example, includes a diagnosis processing interval, a sampling frequency, a measurement time, a cable length, or the like.

The diagnosis setting information acquisition unit 210 acquires diagnosis setting information that is transmitted from the terminal device 300 and is input to the diagnosis setting screen 500 in FIG. 4 (which will be described later).

The diagnosis setting information setting unit 212 sets diagnosis setting information acquired by the diagnosis setting information acquisition unit 210, that is, records the diagnosis setting information in the diagnosis setting information holding unit 230.

The diagnosis target information acquisition unit 214 acquires vibration information for a set measurement time at a set sampling frequency at a set diagnosis processing interval from each sensor 100.

The abnormality determination unit 216 includes a first pre-processing unit 222, a second pre-processing unit 224, and an abnormality determination unit 226. Here, as in the processing unit 200c, there is a case where a plurality of sensors 100 is connected to one processing unit 200. In this case, the lengths of the cables 400 that connect the sensors 100 to the processing unit 200 may vary for each sensor 100. On the other hand, as the length of the cable 400 becomes longer, noise included in vibration information that flows in the cable 400 becomes more. Further, as the cable 400 becomes longer, attenuation of the vibration information that flows in the cable 400 becomes larger. Accordingly, in a case where the length of the cable 400 is changed for each sensor 100, noise included in vibration information or attenuation of vibration information is changed for each sensor 100. Thus, there is a concern that the accuracy of the diagnosis process is lowered. For this reason, the abnormality determination unit 216 of the present embodiment performs a filtering process and a correction process with respect to vibration information using the first pre-processing unit 222 and the second pre-processing unit 224, as described later, to realize a diagnosis process of a relatively high accuracy even in a case where the length of the cable 400 is changed for each sensor 100.

The first pre-processing unit 222 and the second pre-processing unit 224 perform different processes with respect to vibration information acquired from the respective sensors 100, in accordance with interconnect distances between the sensors 100 and the processing units 200, that is, the lengths of the cables (interconnects) 400 that connect the respective sensors 100 to the processing units 200. In this embodiment, the first pre-processing unit 222 and the second pre-processing unit 224 perform different processes with respect to the vibration information acquired from the respective sensors 100 in a case where the length of the cable 400 that connects each sensor 100 to the processing unit 200 (hereinafter, referred to as a "cable length") is equal to or greater than a predetermined length threshold value, that is, in a case where the cable 400 is relatively long, and in a case where the cable length is smaller than the length threshold value, that is, in a case where the cable 400 is relatively short.

The first pre-processing unit 222 performs a filtering process with respect to vibration information. The filtering process is, for example, a low pass filtering process. For example, the first pre-processing unit 222 performs a filtering process in which attenuation is set to be larger in a case where the cable length is equal to or greater than the length threshold value than that in a case where the cable length is smaller than the length threshold value. Further, for example, the first pre-processing unit 222 performs a filtering process in which a filter frequency band is wider in a case where the cable length is equal to or greater than the length threshold value than that in a case where the cable length is smaller than the length threshold value. Further, for example, the first pre-processing unit 222 may execute a filtering process in a case where the cable length is equal to or greater than the length threshold value, and may not execute the filtering process in a case where the cable length is smaller than the length threshold value. That is, the first pre-processing unit 222 may execute a filtering process in which the length of the filter frequency band is substantially zero in a case where the cable length is smaller than the length threshold value. A difference of noises between pieces of vibration information is alleviated by the first pre-processing unit 222.

The second pre-processing unit 224 performs a correction process of amplifying vibration information. For example, the second pre-processing unit 224 performs a correction process in which an amplification gain is set to be larger in a case where the cable length is equal to or greater than the length threshold value than that in a case where the cable length is smaller than the length threshold value. Further, for example, the second pre-processing unit 224 may execute a correction process in a case where the cable length is equal to or greater than the length threshold value, and may not execute the correction process in a case where the cable length is smaller than the length threshold value. That is, the second pre-processing unit 224 may perform a correction process in which an amplification gain is set to 1 in a case where the cable length is smaller than the length threshold value. A difference of noises between pieces of vibration information is alleviated by the second pre-processing unit 224.

The abnormality determination unit 226 determines whether an abnormality occurs in the gear motor 2 corresponding to the sensor 100 that detects, on the basis of each piece of vibration information that is subjected to a filtering process and a correction process, the vibration information. Hereinafter, the determination in the abnormality determination unit 226 is referred to as "abnormality determination". In this embodiment, the abnormality determination unit 226 performs abnormality determination using a diagnosis method set in diagnosis setting information.

In a case where "peak value diagnosis" is set in a diagnosis method, the abnormality determination unit 226 performs abnormality determination on the basis of the size of a peak value of vibration indicated by vibration information. The abnormality determination unit 226 particularly determines that an abnormality occurs in a case where the size of the peak value exceeds an abnormality threshold value.

In a case where "effective value diagnosis" is set in a diagnosis method, the abnormality determination unit 226 performs abnormality determination on the basis of the size of an effective value of vibration indicated by vibration information. The abnormality determination unit 226 particularly determines that an abnormality occurs in a case where the size of the effective value exceeds an abnormality threshold value.

In a case where "FFT diagnosis" is set in a diagnosis method, the abnormality determination unit 226 executes FFT (Fast Fourier Transform) with respect to vibration waveforms based on vibration information, and performs abnormality determination on the basis of the size of a vibration component of a certain specific frequency or a frequency in a certain range among vibration components of respective frequencies obtained as a result of the FFT. The abnormality determination unit 226 particularly determines that an abnormality occurs in a case where the size of a target vibration component exceeds an abnormality threshold value.

In a case where "H-FFT diagnosis" is set in a diagnosis method, the abnormality determination unit 226 executes FFT with respect to envelope curves of vibration waveforms based on vibration information, and performs abnormality determination on the basis of the size of a vibration component of a certain specific frequency or a frequency in a certain range among vibration components of respective frequencies obtained as a result the FFT. The abnormality determination unit 226 particularly determines that an abnormality occurs in a case where the size of a target vibration component exceeds an abnormality threshold value.

Hereinafter, a value extracted from vibration information for abnormality determination in the abnormality determination unit 226, that is, a peak value in peak value diagnosis, an effective value in effective value diagnosis, or the size of a vibration component of a certain specific frequency or a frequency in a certain range in FFT diagnosis or H-FFT diagnosis is referred to as an "evaluation value".

The determination result transmission unit 218 transmits a determination result in the abnormality determination unit 216 together with an evaluation value, a sensor connection channel to which a sensor 100 that detects vibration information that is a basis of the evaluation value is connected, and abnormality determination execution date and time to the terminal device 300.

The diagnosis target information transmission unit 220 receives a transmission request of vibration information from the terminal device 300. After receiving the transmission request, the diagnosis target information transmission unit 220 transmits the vibration information acquired by the diagnosis target information acquisition unit 214 to the terminal device 300.

Figure 3:
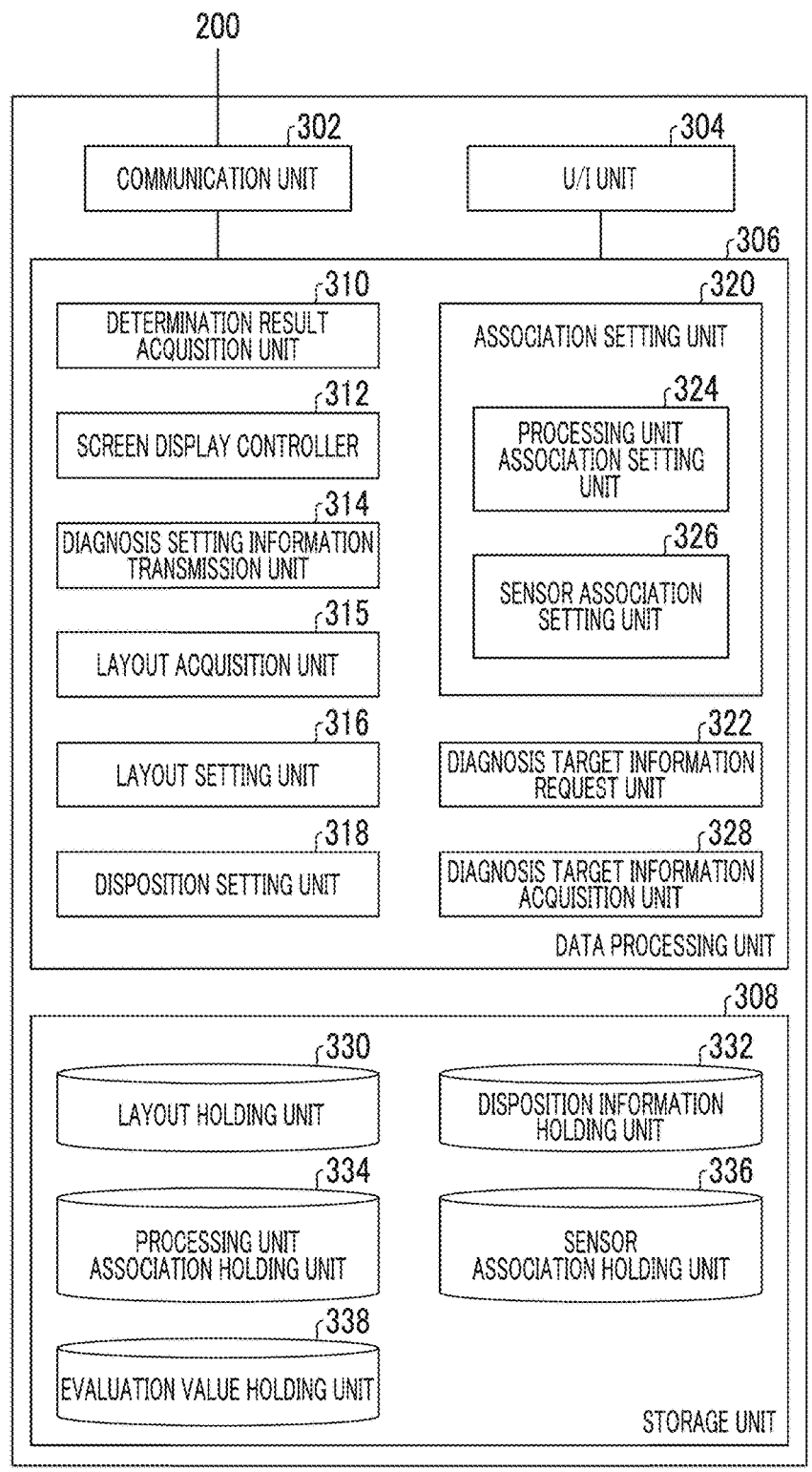
FIG. 3 is a block diagram showing functions and a configuration of a terminal device in FIG. 1.

FIG. 3 is a block diagram showing functions and a configuration of the terminal device 300. The terminal device 300 includes a communication unit 302, a U/I (user interface) unit 304, a data processing unit 306, and a storage unit 308.

The communication unit 302 executes a communication process with the processing units 200 in accordance with various communication protocols. For example, the data processing unit 306 transmits or receives data to or from the processing units 200 through the communication unit 302.

The U/I unit 304 receives an operation input from a user, and causes a display unit to display various screens in accordance with a command from the data processing unit 306.

The storage unit 308 is a storage region that stores data that is referenced and updated by the data processing unit 306. The storage unit 308 includes a layout holding unit 330, a disposition information holding unit 332, a processing unit association holding unit 334, a sensor association holding unit 336, and an evaluation value holding unit 338.

The data processing unit 306 executes various data processes on the basis of data acquired through the communication unit 302 and the U/I unit 304. The data processing unit 306 includes a determination result acquisition unit 310, a screen display controller 312, a diagnosis setting information transmission unit 314, a layout acquisition unit 315, a layout setting unit 316, a disposition setting unit 318, an association setting unit 320, a diagnosis target information request unit 322, and a diagnosis target information acquisition unit 328.

The screen display controller 312 causes the display unit to display various screens. The screen display controller 312 particularly causes the display unit to display the diagnosis setting screen 500, a state monitoring screen 520, a diagnosis result screen 540, a diagnosis trend screen 550, a facility layout setting screen 560, a disposition setting screen 590, a processing unit association screen 570, and a sensor association screen 580. FIGS. 4 to 13 show these screens. The configuration of the terminal device 300 will be described with reference to FIGS. 4 to 13, in addition to FIG. 3.

Figure 4:
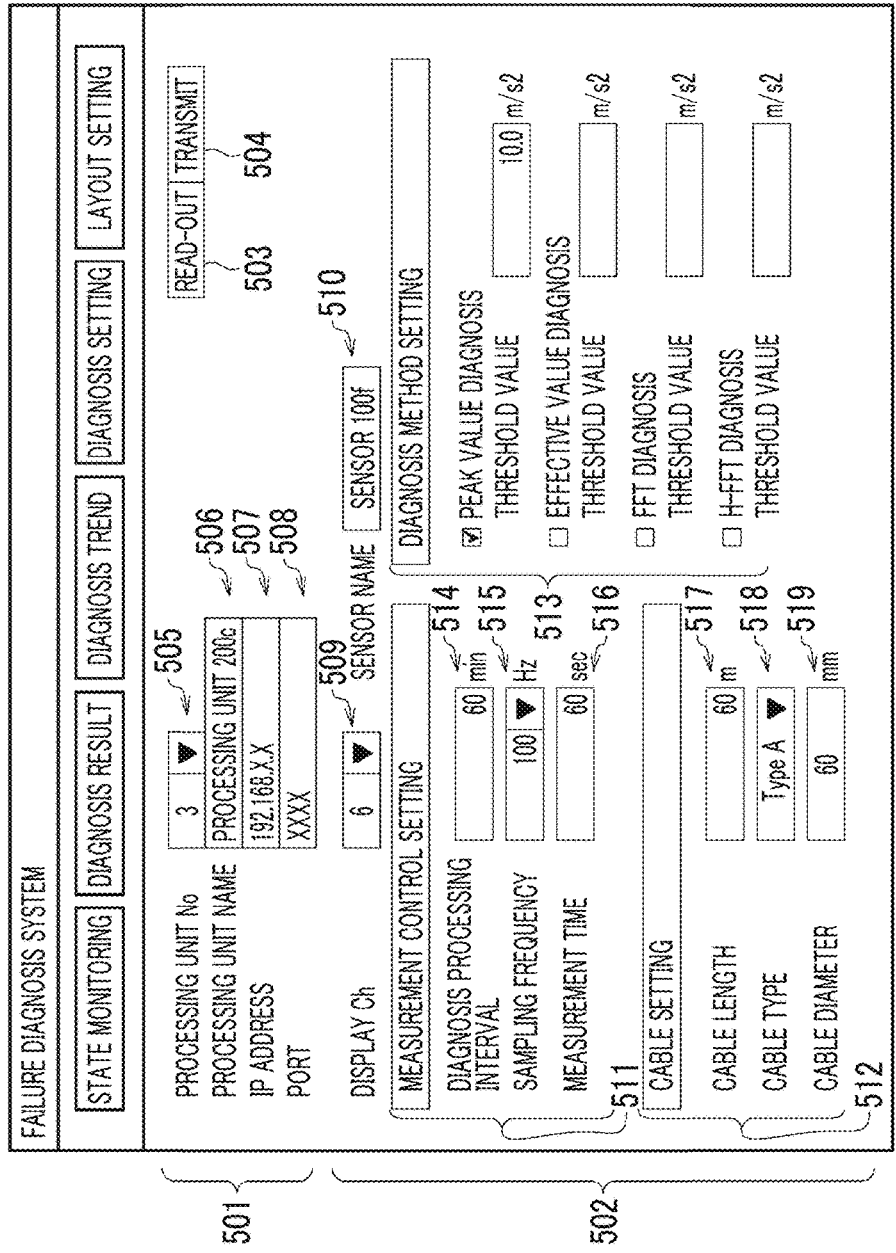
FIG. 4 is a diagram showing a diagnosis setting screen.

FIG. 4 shows the diagnosis setting screen 500. The diagnosis setting screen 500 includes a processing unit region 501, a sensor region 502, a read-out button 503, and a transmit button 504. The processing unit region 501 includes a processing unit No section 505, a processing unit name section 506, an IP (internet protocol) address section 507, and a port No section 508.

In the processing unit No section 505, an identification number for uniquely identifying a processing unit 200 is selected. In this embodiment, in the processing unit No section 505, any number of 1 to 16 may be selected. That is, in this embodiment, maximum 16 processing units 200 may be managed using one terminal device 300.

A name for identifying the processing unit 200 is input to the processing unit name section 506. An IP address allocated to or to be allocated to the processing unit 200 is input to the IP address section 507. A port number that is opened for reception of a transmission request, transmission of vibration information, or the like by the processing unit 200 is input to the port No section 508.

The sensor region 502 includes a display ch section 509, a sensor name section 510, a measurement control setting region 511, a cable setting region 512, and a diagnosis method setting region 513. In the display ch section 509, a connection channel to which a sensor 100 for diagnosis setting is to be connected is selected. In the display ch section 509, any number of 1 to 12 may be selected. That is, in this embodiment, 12 sensors 100 may be connected to the respective processing units 200. A name for identifying the sensor 100 is input to the sensor name section 510. Further, in the measurement control setting region 511, the cable setting region 512, and the diagnosis method setting region 513, a setting input relating to the sensor 100 specified from information input to the display ch section 509 and the sensor name section 510 is performed.

The measurement control setting region 511 includes a diagnosis processing interval 514, a sampling frequency 515, and a measurement interval 516. An interval at which a diagnosis process is to be executed is input to the diagnosis processing interval 514. The frequency of acquisition, in a processing unit 200, of vibration information transmitted from a sensor 100 is input to the sampling frequency 515. A period of time during which the diagnosis target information acquisition unit 214 acquires vibration information in a one-time diagnosis process is input to the measurement interval 516. In other words, vibration information corresponding to a certain period of time used for a one-time diagnosis process is input to the measurement interval 516.

The cable setting region 512 includes a cable length 517, a cable type 518, and a cable diameter 519. The cable length of the cable 400 is input to the cable length 517. The type of the cable 400 is selected in the cable type 518. The diameter of the cable 400 is input to the cable diameter 519. In this embodiment, in a case where the cable type 518 is selected, the cable diameter 519 is automatically input. In this embodiment, the cable type and the cable diameter may be set for each sensor 100, but in general, since cables connected to one processing unit 200 are generally disposed in many cases, the cable types and the cable diameters may be collectively set for the respective processing units 200.

In the diagnosis method setting region 513, a diagnosis method of abnormality determination in a processing unit 200 is set. In this embodiment, the diagnosis method may be selected from four diagnosis methods of peak value diagnosis, effective value diagnosis, FFT diagnosis, and H-FFT diagnosis. A plurality of diagnosis methods may be selected. In the example of FIG. 4, the peak value diagnosis is selected. Further, in the diagnosis method setting region 513, an abnormality threshold value of abnormality determination is set.

The diagnosis setting information transmission unit 314 records diagnosis setting information input to the diagnosis setting screen 500 in the storage unit 308, and transmits the diagnosis setting information to a processing unit 200. Specifically, in a case where the transmit button 504 of the diagnosis setting screen 500 is pressed, the diagnosis setting information transmission unit 314 transmits the diagnosis setting information input to the diagnosis setting screen 500 to the processing unit 200 corresponding a number (No) input to the processing unit No section 505. As the diagnosis setting information, information set and input in the measurement control setting region 511, the cable setting region 512, and the diagnosis method setting region 513 is transmitted as setting information relating to a sensor 100 specified from information input to the display ch section 509 and the sensor name section 510. Here, with respect to the cable length, information indicating whether the cable length is equal to or greater than a length threshold value or smaller than the length threshold value, instead of a numerical value input in the cable length 517, is transmitted. The numerical value itself of the cable length may be transmitted, and it may be determined whether the cable length is equal to or greater than the length threshold value or smaller than the length threshold value in a processing unit 200.

In a case where the read-out button 503 is pressed in a state where the processing unit No section 505 is selected, diagnosis setting information is read out from a corresponding processing unit 200 and is displayed in the processing unit region 501. Further, in a case where the read-out button 503 is pressed in a state where the display ch section 509 is also selected, diagnosis setting information relating to a corresponding sensor 100 is displayed in the sensor region 502.

The processing unit 200 executes a diagnosis process in accordance with diagnosis setting information input in the diagnosis setting screen 500. The determination result acquisition unit 310 acquires a determination result, an evaluation value, a connection channel, and abnormality determination date and time transmitted from the processing unit 200 that executes the diagnosis process. The determination result acquisition unit 310 records the acquired determination result, evaluation value, connection channel and abnormality determination date and time, together with the processing unit No of the processing unit 200 that is a transmission source, in the evaluation value holding unit 338.

Figure 5:
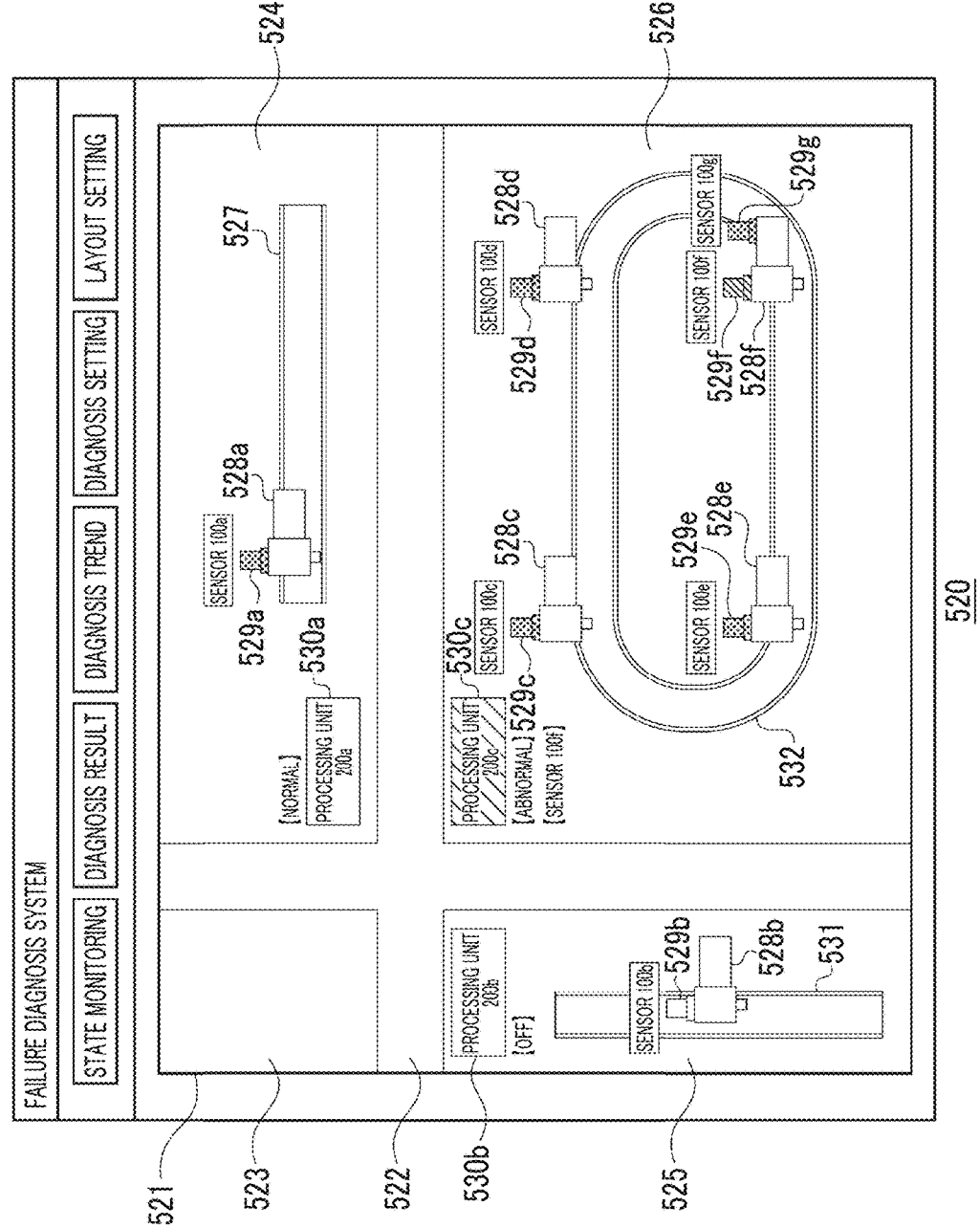
FIG. 5 is a diagram showing a state monitoring screen.

FIG. 5 shows the state monitoring screen 520. The state monitoring screen 520 includes a disposition screen display region 521. Here, a room where facilities are present is displayed in the disposition screen display region 521. The room is divided into four spaces of a first space 523, a second space 524, a third space 525, and a fourth space 526 by a passage 522.

In the second space 524, a belt conveyor image 527 indicating a belt conveyor, a gear motor image 528a indicating a gear motor 2a that drives the belt conveyor, a sensor image 529a indicating a sensor 100a, and a processing unit image 530a indicating the processing unit 200a are disposed.

In the third space 525, a belt conveyor image 531 indicating a belt conveyor, a gear motor image 528b indicating a gear motor 2b that drives the belt conveyor, a sensor image 529b indicating a sensor 100b, and a processing unit image 530b indicating the processing unit 200b are disposed.

In the fourth space 526, an image of a belt conveyor image 532 indicating a belt conveyor, gear motor images 528c to 528f indicating gear motors 2c to 2f that drive the belt conveyor, sensor images 529c to 529g indicating sensors 100c to 100g, and a processing unit image 530c indicating the processing unit 200c are disposed.

A facility layout of the disposition screen display region 521 is created in the facility layout setting screen 560 (which will be described later), and the gear motor image 528, the sensor image 529, and the processing unit image 530 that are disposed on the facility layout are disposed in the disposition setting screen 590 (which will be described later). The gear motor image 528, the sensor image 529, and the processing unit image 530 are disposed on the facility layout in a form of resembling a real disposition of the gear motor 2, the sensor 100, and the processing unit 200. The sensor image 529 is disposed on the facility layout in a form of resembling even an attachment position.

In the state monitoring screen 520, on the basis of a determination result acquired by the determination result acquisition unit 310, a gear motor 2 for which it is determined that an abnormality occurs is notified to be identifiable from a gear motor 2 for which it is not determined that an abnormality occurs. In this embodiment, a sensor image 529 of a sensor 100 (hereinafter, referred to as an "abnormality detection sensor") that detects vibration information that is a basis of determination of abnormality occurrence is displayed in a form of being identifiable from a sensor image 529 of another sensor 100 (hereinafter, referred to as a "non-abnormality detection sensor"), so that it is notified that an abnormality occurs in the corresponding gear motor 2. For example, the sensor image 529 of the abnormality detection sensor may be displayed using a color different from that of the sensor image of the non-abnormality detection sensor.

For example, in a case where the sensor 100f is the abnormality detection sensor and the other sensors 100 are the non-abnormality detection sensors, the sensor image 529f of the sensor 100f may be displayed in red, and the sensor images 529 of the other sensors 100 may be displayed in blue. Thus, it is possible to recognize at a glance that an abnormality occurs in the gear motor 2f to which the sensor 100f is attached. As the sensor image 529f is displayed in red and the sensor image 529g is displayed in blue, it is also possible to recognize that a possibility that an abnormality occurs on the side of an output shaft to which the sensor 100f is attached is high.

Further, in the state monitoring screen 520, a processing unit image 530 of a processing unit 200 (hereinafter, referred to as an "abnormality detection unit") to which at least one abnormality detection sensor is connected is displayed in a form of being identifiable from a processing unit image 530 of a processing unit 200 (hereinafter, referred to as a "non-abnormality detection unit") to which an abnormality detection sensor is not connected. In this embodiment, the processing unit image 530 of the abnormality detection unit is displayed in read, and the processing unit image 530 of the non-abnormality detection unit is displayed in green. Further, in the vicinity of the processing unit image of the abnormality detection unit, characters of "abnormal" and a sensor name of the abnormality detection sensor are displayed, and in the vicinity of the processing unit image of the non-abnormality detection unit, characters of "normal" are displayed.

Further, in the state monitoring screen 520, a processing unit 200 that is not operated and a processing unit 200 that is operated are displayed to be identifiable from each other. In this embodiment, a processing unit image 530 of the processing unit 200 that is not operated and a sensor image 529 of a sensor 100 connected to the processing unit 200 are displayed in white. Further, in the vicinity of the processing unit image 530 of the processing unit 200 that is not operated, characters of "OFF" are displayed.

Figure 6:
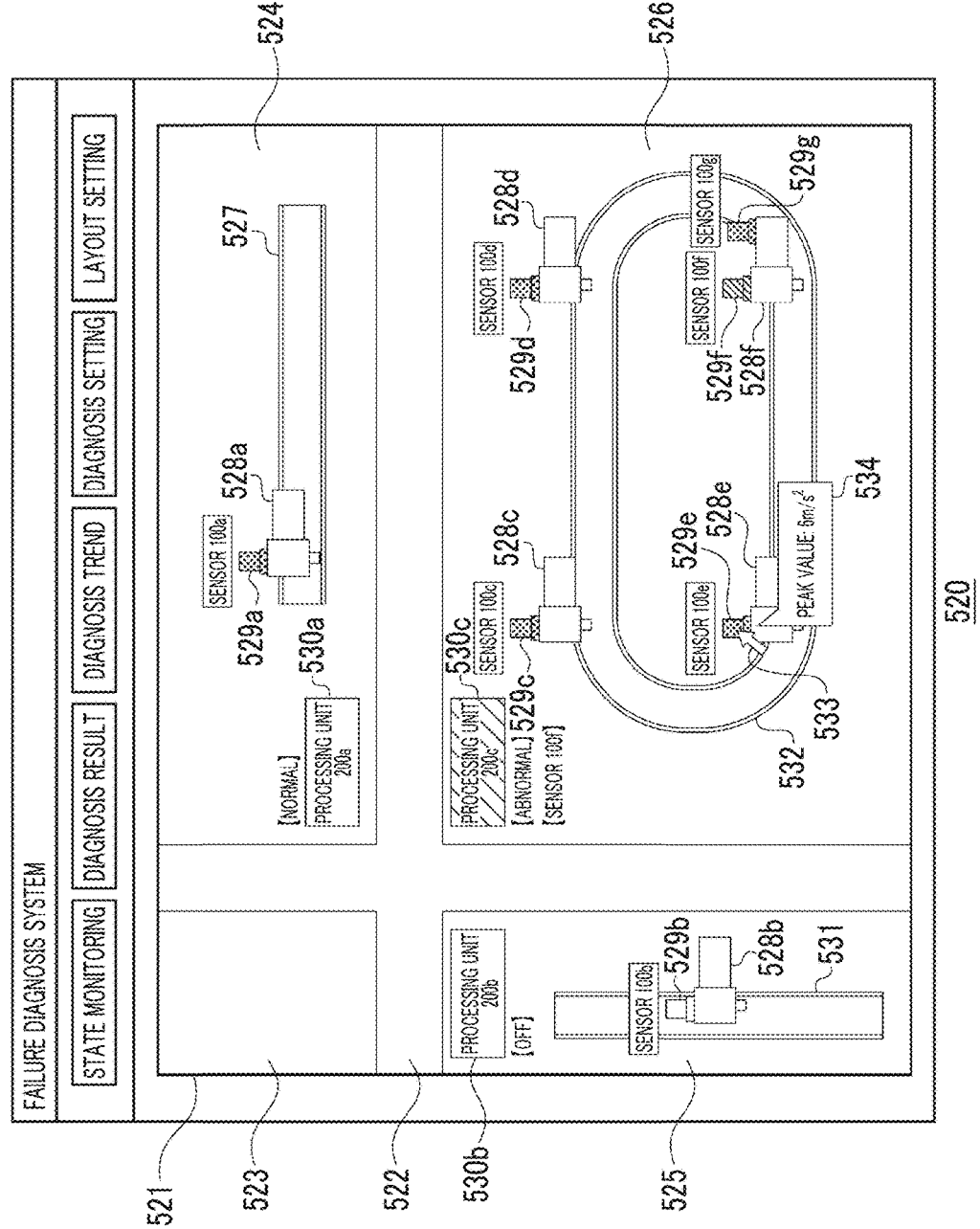
FIG. 6 is a diagram showing a state monitoring screen.
Figure 7:
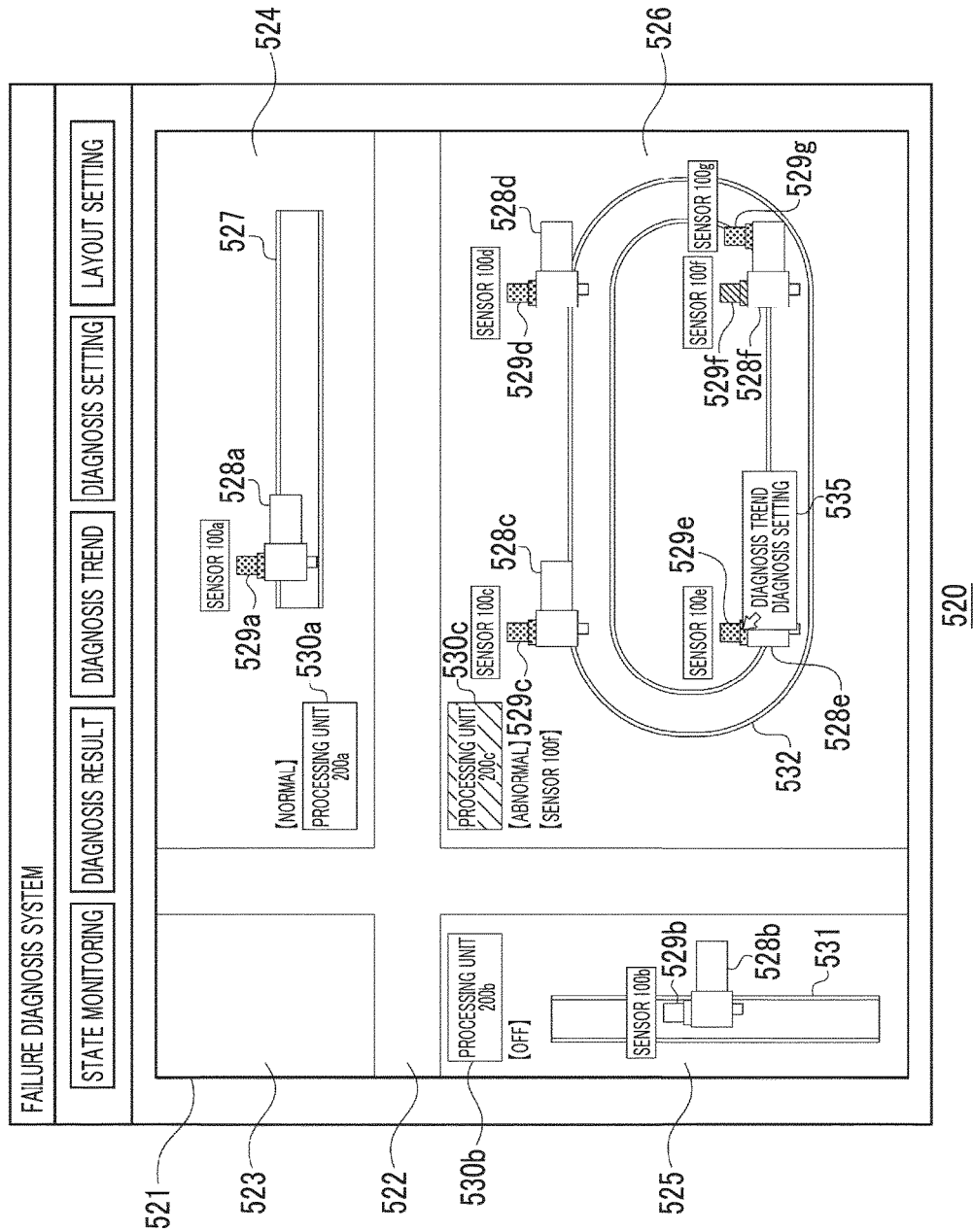
FIG. 7 is a diagram showing a state monitoring screen.

FIGS. 6 and 7 also show the state monitoring screen 520. In the state monitoring screen 520, in a case where a gear motor 2 is selected in the disposition screen display region 521, detailed information on the selected gear motor 2 is displayed. The selection of the gear motor 2 may be any selection capable of specifying the gear motor 2 of which detailed information is to be displayed. Accordingly, the selection is not limited to a case where a gear motor image of the gear motor 2 of which detailed information is to be displayed is selected, and for example, may include a case where a sensor image of a sensor 100 attached to the gear motor 2 of which detailed information is to be displayed is selected, as will be described later.

In the example of FIG. 6, in a case where any sensor image 529 is selected using pointing of a mouse cursor 533 in the state monitoring screen 520, an evaluation value based on vibration information detected by a sensor 100 associated with the sensor image 529 is displayed in a pop-up (superimposing) form using a vibration information display region 534 as detailed information. As shown in FIG. 6, in a case where the mouse cursor 533 is pointed to a sensor image 529e, an evaluation value (herein, a peak value) based on vibration information detected by the sensor 100e associated with the sensor image 529e is displayed by pop-up display of the vibration information display region 534.

Specifically, the screen display controller 312 specifies a processing unit No and a connection channel of a processing unit 200 to which a sensor 100 corresponding to a sensor image 529 selected in the state monitoring screen 520 is connected, with reference to the sensor association holding unit 336 (of which details will be described later). Further, the screen display controller 312 acquires an evaluation value for which abnormality determination data and time are latest among evaluation values of the specified processing units No and connection channels, with reference to the evaluation value holding unit 338. The screen display controller 312 displays the acquired evaluation value by popup display of the vibration information display region 534.

In the example of FIG. 7, in a case where any sensor image 529 is selected in the state monitoring screen 520 and right-click or an operation of a specific key is performed, a pop-up menu 535 is displayed. In the example of FIG. 7, in the pop-up menu 535, "diagnosis trend" and "diagnosis setting" are displayed as choices. In a case where the "diagnosis trend" is selected, the screen shifts to the diagnosis trend screen 550 (which will be described in FIG. 9). Particularly, the screen shifts to the diagnosis trend screen 550 in a state where a trend graph based on vibration information detected by a sensor 100 associated with the selected sensor image 529 is displayed in a graph 552 (which will be described later). Further, in a case where the "diagnosis setting" is selected, the screen shifts to the diagnosis setting screen 500. Particularly, the screen shifts to the diagnosis setting screen 500 in a state where diagnosis setting information of the sensor 100 associated with the selected sensor image 529 is displayed (state of FIG. 4).

In a case where the processing unit image 530 is selected and the right-click or the operation of the specific key is performed, similarly, a pop-up menu may be displayed. In this case, as the pop-up menu, for example, "diagnosis result" may be displayed as a choice, and in a case where the "diagnosis result" is selected, the screen may shift to the diagnosis result screen 540 in a state where a diagnosis result of a processing unit 200 corresponding to the selected processing unit image 530 is displayed.

Figure 8:
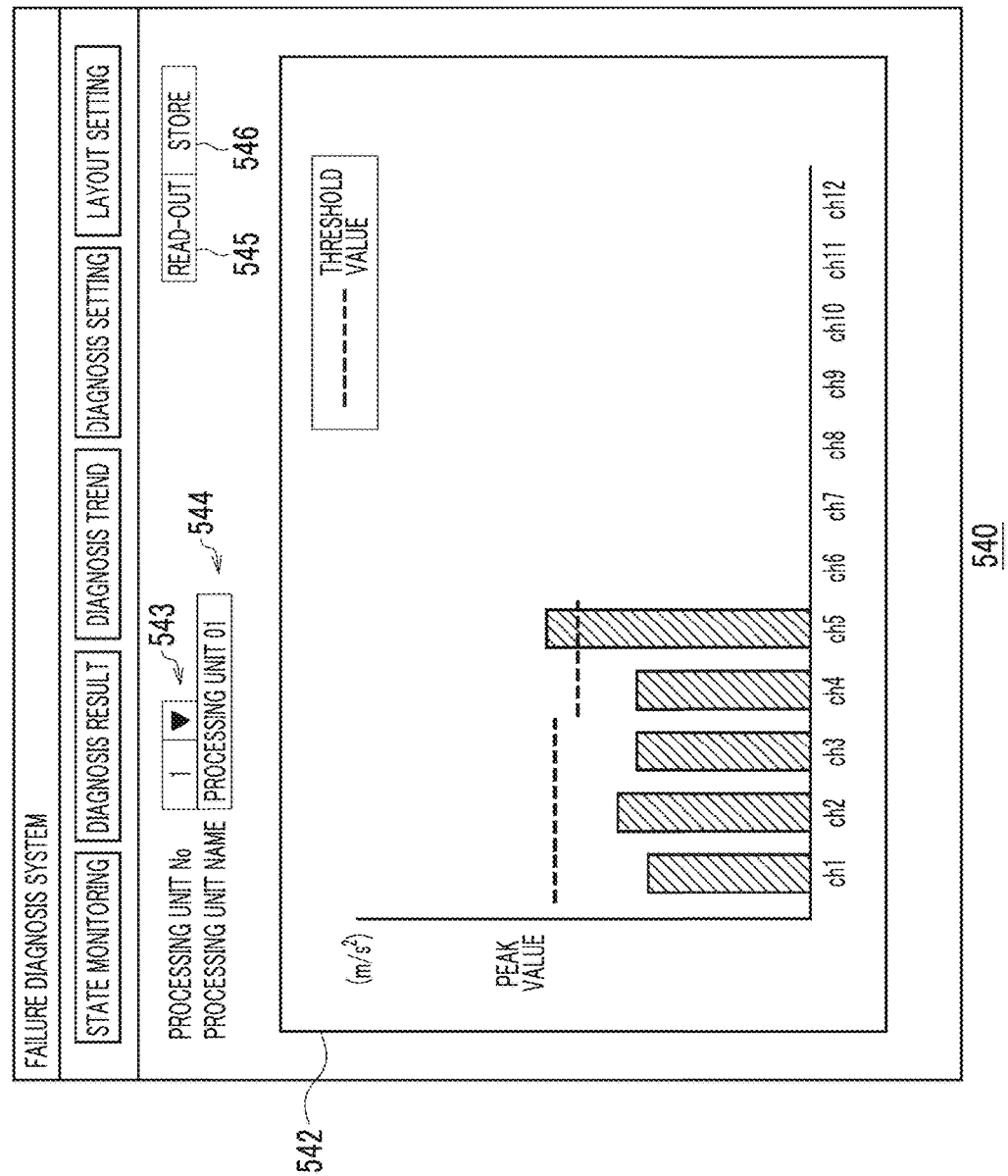
FIG. 8 is a diagram showing a diagnosis result screen.

FIG. 8 shows the diagnosis result screen 540. The diagnosis result screen 540 includes a processing unit No section 543, a processing unit name section 544, and a graph 542. In the processing unit No section 543, an identification number of a processing unit for displaying a diagnosis result is selected. In the processing unit name section 544, a processing unit name of the processing unit 200 selected in the processing unit No section 543 is displayed.

In a case where the read-out button 545 is pressed in a state where the processing unit 200 is selected, the graph 542 is displayed. The graph 542 represents an evaluation value based on vibration information detected by each sensor 100 connected to the processing unit 200 selected in the processing unit No section 543. Specifically, the screen display controller 312 acquires the latest evaluation value of each connection channel of the processing unit No selected in the processing unit No section 543, with reference to the evaluation value holding unit 338. The screen display controller 312 displays the acquired evaluation value of the each connection channel in the graph 542.

In the example of FIG. 8, a diagnosis result of peak value diagnosis is displayed. A transverse axis in the graph 542 represents a channel of the processing unit 200 to which the sensor 100 is connected. A longitudinal axis represents the size of the peak value. In a case where a diagnosis result of effective value diagnosis is displayed, the longitudinal axis represents the size of the effective value, and in a case where a diagnosis result of FFT diagnosis or H-FFT diagnosis is displayed, the longitudinal axis represents the magnitude of a target vibration component. In a case where a store button 546 is pressed, data on the graph 542 that is being displayed is stored in the terminal device 300.

Figure 9:
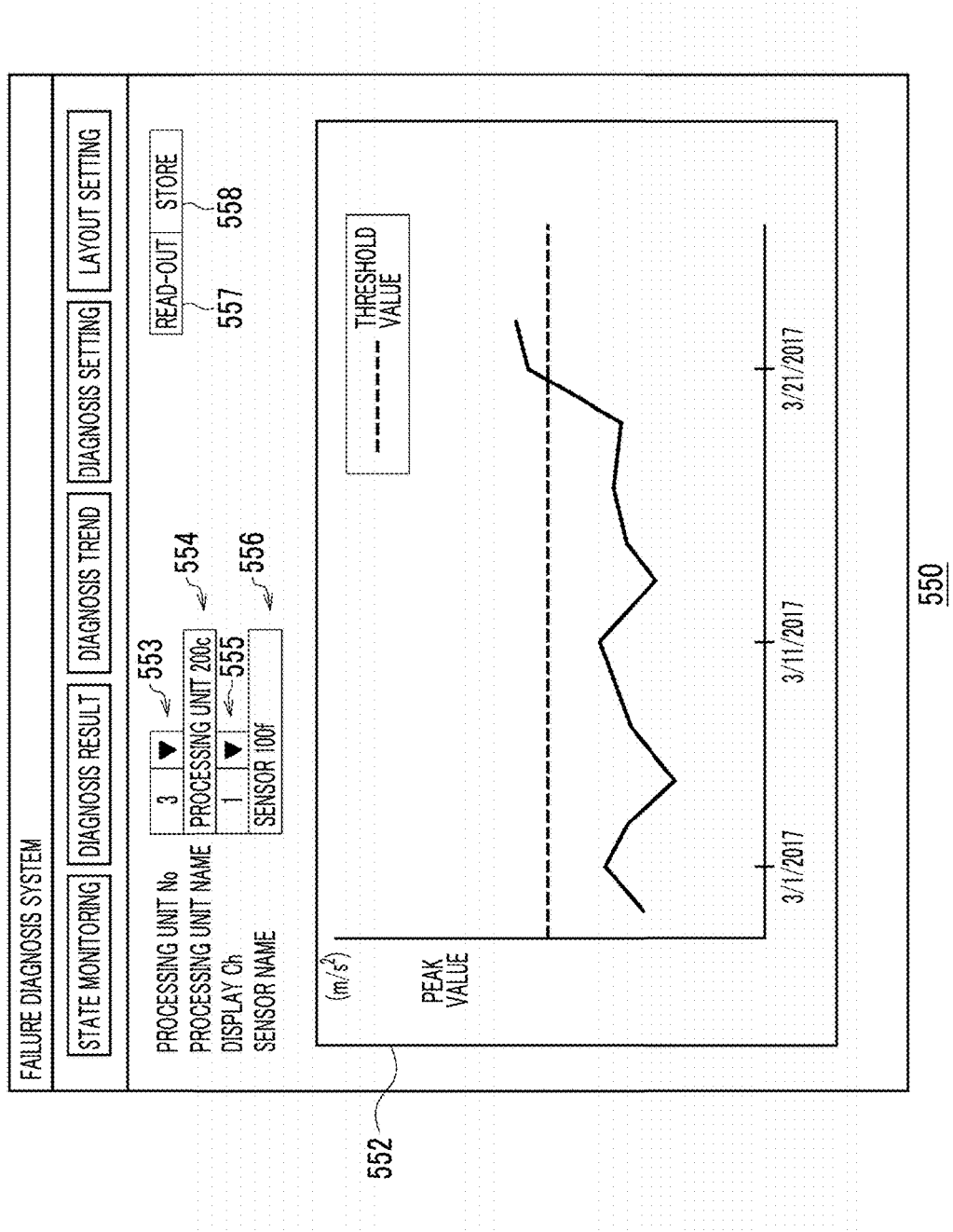
FIG. 9 is a diagram showing a diagnosis trend screen.

FIG. 9 shows the diagnosis trend screen 550. The diagnosis trend screen 550 includes a processing unit No section 553, a processing unit name section 554, a display ch section 555, a sensor name section 556, and a graph 552. In the processing unit No section 553, a management number for managing a processing unit 200 is selected. In the processing unit name section 554, a processing unit name of the processing unit 200 selected in the processing unit No section 553 is displayed. In the display ch section 555, a connection channel connected to a sensor 100 for displaying a trend graph of evaluation values, that is, a temporal progress of evaluation values is selected. In the sensor name section 556, a sensor name of the sensor 100 selected in the display ch section 555 is displayed.

In a case where a read-out button 557 is pressed in a state where the processing unit 200 and the sensor 100 are selected, the graph 552 is displayed. The graph 552 displays a trend graph of evaluation values based on vibration information detected by the sensor 100 specified by the processing unit No selected in the processing unit No section 553 and the connection channel selected in the display ch section 555. Specifically, the screen display controller 312 acquires evaluation values for a predetermined period (for example, recent 30 days) among evaluation values in the processing unit No selected in the processing unit No section 553 and the connection channel, with reference to the evaluation value holding unit 338. The screen display controller 312 displays the acquired evaluation values for the predetermined period in the graph 552.

Further, as described in FIG. 7, in a case where any sensor image 529 is selected in the state monitoring screen 520 to display the pop-up menu 535 and "diagnosis trend" is selected from displayed choices, the state monitoring screen 520 shifts to the diagnosis trend screen 550. In this case, a trend graph based on vibration information detected by a sensor 100 associated with the sensor image 529 selected in the state monitoring screen 520 that is a shift source is automatically displayed in the graph 552.

Specifically, the screen display controller 312 acquires a processing unit No and a processing unit name of a processing unit 200 to which the sensor 100 corresponding to the sensor image 529 selected in the state monitoring screen 520 is connected, a connection channel to which the sensor 100 is connected, and a sensor name, with reference to the sensor association holding unit 336. Further, the screen display controller 312 acquires evaluation values for a predetermined period (for example, latest 30 days) among evaluation values in the acquired processing unit No and connection channel, with reference to the evaluation value holding unit 338. Further, the screen display controller 312 displays the acquired processing unit No, processing unit name, connection channel, and sensor name in the processing unit No section 553, the processing unit name section 554, the display ch section 555, and the sensor name section 556 of the diagnosis trend screen 550 in FIG. 9, and displays the acquired evaluation values for the predetermined period in the graph 552.

In the example of FIG. 9, a trend graph of peak value diagnosis is displayed. In the graph 552, a transverse axis represents time. A longitudinal axis represents the size of a peak value. In a case where a trend graph of effective value diagnosis is displayed, a longitudinal axis represents the size of an effective value, and in a case where a trend graph of FFT diagnosis or H-FFT diagnosis is displayed, a longitudinal axis represents the magnitude of a target vibration component. In a case where the store button 558 is pressed, data on the graph 552 that is being displayed is stored in the terminal device 300.

Figure 10:
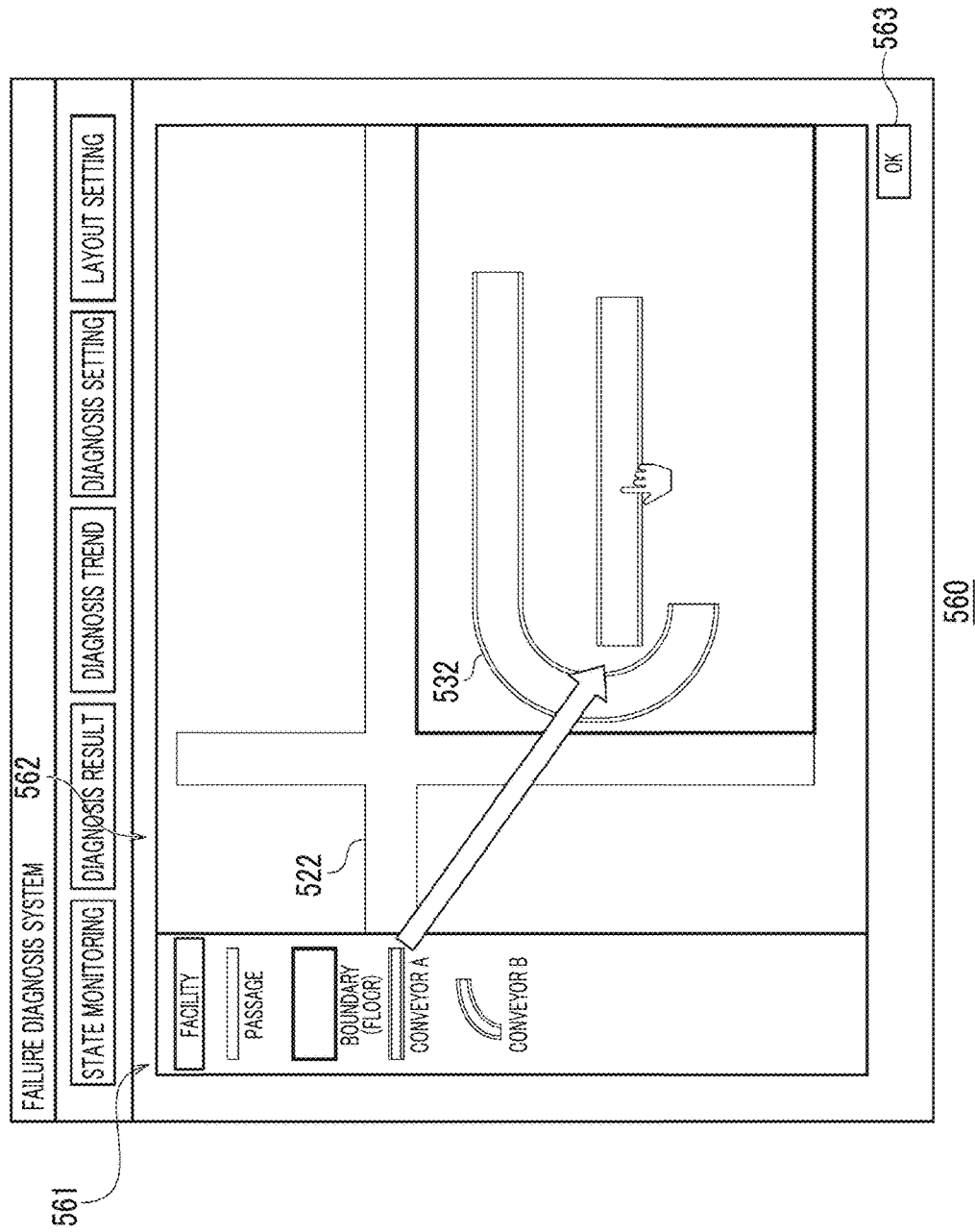
FIG. 10 is a diagram showing a facility layout setting screen.

FIG. 10 shows the facility layout setting screen 560. The facility layout setting screen 560 includes a part region 561 and a facility layout display region 562. In the part region 561, a passage image, a boundary (floor) image and a conveyor image are displayed. An image in the part region 561 is disposed in the facility layout display region 562 by a drag-and-drop operation and is appropriately enlarged or reduced to thereby create a facility layout.

The layout acquisition unit 315 acquires the facility layout created in the facility layout setting screen 560. Specifically, the layout acquisition unit 315 acquires facility layout information indicating a disposition and the size of each facility image in the facility layout.

The layout setting unit 316 records the facility layout information acquired by the layout acquisition unit 315 in the layout holding unit 330.

Figure 11:
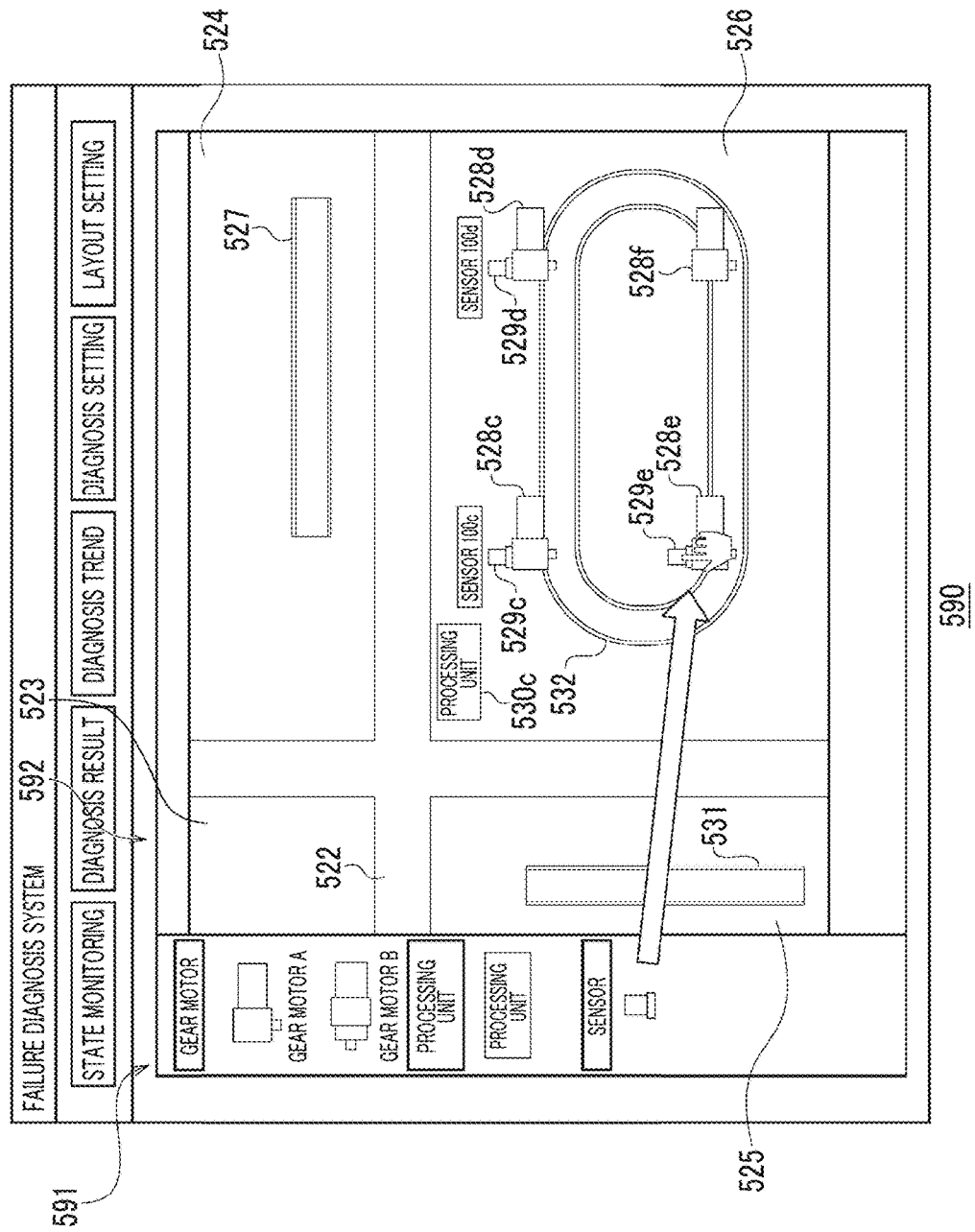
FIG. 11 is a diagram showing a disposition setting screen.

FIG. 11 shows the disposition setting screen 590. The disposition setting screen 590 is displayed in a case where an OK button 563 is pressed in the facility layout setting screen 560 in FIG. 10, for example. In the disposition setting screen 590, on the facility layout created in the facility layout setting screen 560 in FIG. 10, a disposition of the gear motor 2 is set in a form of resembling an actual disposition. Here, the "setting of the disposition of the gear motor 2" means that a disposition of a gear motor 2 in the facility layout is set to be identifiable. Accordingly, for example, the above-described setting may be setting of a disposition of a gear motor image that resembles the gear motor 2 on the facility layout. Further, for example, the above-described setting may be setting of a disposition of a sensor image indicating a sensor 100, instead of the gear motor image. The reason is as follows. Since a gear motor 2 correspondingly exists at a place where a sensor 100 exists, even in a case where a sensor image is disposed instead of a gear motor image, it can be confirmed that the gear motor 2 is disposed at that place. Furthermore, for example, the above-described setting may be setting of disposition of an image of a figure such as a simple rectangular frame, instead of the image that resembles the gear motor 2 or the sensor 100.

In the example of FIG. 11, the disposition setting screen 590 includes a part region 591 and a disposition setting region 592. In the part region 591, a gear motor image, a processing unit image, and a sensor image are displayed. In the disposition setting region 592, the facility layout created in FIG. 10 is displayed. An image (for example, a gear motor image) in the part region 591 is disposed on the facility layout of the disposition setting region 592 by the drag-and-drop operation. That is, in the example of FIG. 11, a disposition of the gear motor image is set on the facility layout.

The disposition setting unit 318 acquires disposition information indicating dispositions of a gear motor image 528, a sensor image 529, and a processing unit image 530 disposed on the facility layout in the disposition setting screen 590. The disposition setting unit 318 records the acquired disposition information in the disposition information holding unit 332.

The setting in FIGS. 10 and 11 may be performed on one screen.

FIG. 12 shows the processing unit association screen 570. The processing unit association screen 570 is a screen for associating the processing unit image 530 in FIG. 11 with an actual processing unit 200. In the disposition setting screen 590 of FIG. 11, in a case where the processing unit image 530 is selected (for example, by double-click), the processing unit association screen 570 is displayed. In the processing unit association screen 570, a list 571 of processing unit identification information for identifying the processing unit 200 is displayed, on the basis of information that is set in the screen in FIG. 4 and is stored in the storage unit 308. The processing unit identification information is a processing unit No or a processing unit name, for example. Processing unit identification information associated with the processing unit image 530 is selected (for example, by double-click) from the displayed list 571.

FIG. 13 shows the sensor association screen 580. The sensor association screen 580 is a screen for associating the sensor image 529 in FIG. 11 with an actual sensor 100. In the disposition setting screen 590 of FIG. 11, in a case where the sensor image 529 is selected (for example, by double-click), the sensor association screen 580 is displayed. In the sensor association screen 580, a list 581 of sensor identification information for identifying the sensor 100 is displayed, on the basis of information that is set in the screen in FIG. 4 and is stored in the storage unit 308. The sensor identification information includes, for example, a sensor name, a processing unit No, a processing unit name, and a connection channel. Sensor identification information associated with the sensor image 529 is selected from the displayed list 581.

The association setting unit 320 includes a processing unit association setting unit 324 and a sensor association setting unit 326. The processing unit association setting unit 324 sets association between the processing unit image 530 disposed on facility layout and processing unit identification information for identifying the processing unit 200. Specifically, the processing unit association setting unit 324 records the processing unit image 530 selected in the processing unit association screen 570 in FIG. 12 and the processing unit identification information in the processing unit association holding unit 334 in association.

The sensor association setting unit 326 sets association between the gear motor image 528 disposed on the facility layout and sensor identification information for identifying a sensor 100 attached to a gear motor 2 indicated by the gear motor image 528. Here, the association may be any association for knowing that the gear motor image 528 and the sensor identification information correspond to each other, and is not limited to a case where the gear motor image 528 and the sensor identification information are directly associated with each other. For example, the above-described association may by association between the sensor image 529 and the sensor identification information. The reason is as follows. That is, since the gear motor image 528 and the sensor image 529 of the sensor 100 attached to the gear motor 2 indicated by the gear motor image 528 are associated with each other at disposition positions, that is, are adjacently disposed, in a case where the association between the sensor image 529 and the sensor identification information is known, it is also possible to know the association between the gear motor image 528 and the sensor identification information.

In this embodiment, the sensor association setting unit 326 records the sensor image 529 selected in the sensor association screen 580 of FIG. 13 and the sensor identification information in the sensor association holding unit 336 in association, that is, sets the association of the sensor image 529 and the sensor identification information.

The sensor association holding unit 336 holds a sensor image and sensor identification information in association. Specifically, the sensor association holding unit 336 holds a sensor image, a sensor name of a sensor 100 associated with the sensor image, a processing unit No of a processing unit 200 to which the sensor 100 is connected, a processing unit name, and a connection channel in association.

A diagnosis target information request unit 322 transmits a transmission request of vibration information to a processing unit 200. For example, in a case where a user checks the state monitoring screen 520 and knows that an abnormality occurs in a gear motor 2, the user inputs a transmission request of vibration information with respect to the gear motor 2 where the abnormality occurs through the U/I unit 304 in order to perform detailed analysis. The diagnosis target information request unit 322 receives the input, and transmits the transmission request. The diagnosis target information acquisition unit 328 acquires vibration information transmitted in accordance with the transmission request.

An operation of the failure diagnosis system 10 configured as described above will be described. A user inputs diagnosis setting information to the diagnosis setting screen 500 of FIG. 4. The terminal device 300 acquires the diagnosis setting information input to the diagnosis setting screen 500, and transmits the result to the processing unit 200. The processing unit 200 holds the transmitted diagnosis setting information.

Further, the user creates a facility layout in the facility layout setting screen 560 of FIG. 10, and disposes a gear motor image 528, a sensor image 529, and a processing unit image 530 on the facility layout in the disposition setting screen 590 of FIG. 11. The terminal device 300 acquires facility layout information on the created facility layout and disposition information on the respective images disposed on the facility layout.

Further, the user associates a processing unit with processing unit identification information in the processing unit association screen 570 of FIG. 12, and associates a sensor image with sensor identification information in the sensor association screen 580 of FIG. 13. The terminal device 300 holds the association information.

In a case where a predetermined start command is received, the processing unit 200 acquires vibration information for a set measurement time at a set sampling frequency at a diagnosis processing interval set in the diagnosis setting information from each sensor 100. The processing unit 200 executes a diagnosis process on the basis of the acquired vibration information. Specifically, the processing unit 200 executes a filtering process and a correction process with respect to the vibration information in accordance with a cable length, and executes an abnormality determination on the basis of the processed vibration information. The processing unit 200 transmits a determination result of the abnormality determination to the terminal device 300.

The terminal device 300 displays the state monitoring screen 520 on the basis of the determination result. The user confirms the state monitoring screen 520 to recognize whether an abnormality occurs in a gear motor 2, and to recognize, in a case where the abnormality occurs, which gear motor 2 the abnormality occurs in and which space of a facility the gear motor 2 is disposed in.

According to the failure diagnosis system 10 according to the above-described embodiment, in the state monitoring screen 520, the sensor image 529 of an abnormality detection sensor is displayed in a form of being identifiable as the sensor image 529 of the non-abnormality detection sensor. Thus, it is possible to recognize that an abnormality occurs in a gear motor 2 corresponding to the abnormality detection sensor at a glance.

According to the failure diagnosis system 10 according to the above-described embodiment, in the state monitoring screen 520, the sensor image 529 of an abnormality detection sensor is displayed in a form of being identifiable as the sensor image 529 of the non-abnormality detection sensor. Thus, it is possible to recognize that an abnormality occurs in a gear motor 2 corresponding to the abnormality detection sensor at a glance.

In addition, according to the failure diagnosis system 10 according to the embodiment, in a case where a mouse cursor is pointed to a sensor image 529 in the state monitoring screen 520, vibration information detected by a sensor 100 associated with the sensor image 529 is displayed in a pop-up form. Thus, the user can easily confirm the vibration information detected by the sensor 100.

Further, according to the failure diagnosis system 10 according to the embodiment, in a case where two (that is, plural) sensors 100 are provided in one gear motor 2, an abnormality detection sensor among the plural sensors 100 is displayed to be identifiable from a non-abnormality detection sensor. Thus, it is possible to accurately specify a portion where an abnormality occurs.

In addition, according to the failure diagnosis system 10 according to the embodiment, the abnormality determination unit 216 executes different processes with respect to vibration information detected by respective sensors 100 according to lengths of the cables 400. Specifically, for example, in a case where the length of the cable 400 is long, attenuation of a filtering process is increased, or a filter frequency band becomes wide. Thus, the influence of noise is alleviated. Further, for example, in a case where the cable 400 is long, an amplification gain of a correction process is increased. Thus, attenuation of the vibration information is decreased. That is, according to this embodiment, since the influence due to different lengths of the cables 400 for the sensors 100 is alleviated, it is possible to prevent reduction of the accuracy of abnormality determination in the abnormality determination unit 216.

Hereinbefore, the failure diagnosis system according to the embodiments has been described. The embodiments are merely examples, and it can be understood by those skilled in the art that various modification examples are available by combination of respective components or respective processes and the modification examples are included in the scope of the invention. Hereinafter, modification examples will be described.

Modification Example 1

In the embodiments, a case where the abnormality determination unit 216 of the processing unit 200 includes the first pre-processing unit 222 and the second pre-processing unit 224 has been described, but the invention is not limited thereto. The abnormality determination unit 216 may include only any one of the first pre-processing unit 222 and the second pre-processing unit 224. That is, the abnormality determination unit 216 may execute only one of a filtering process a correction process with respect to vibration information.

Modification Example 2

Although particularly not mentioned in the embodiments and the above-described modification example, the abnormality determination unit 226 may change determination conditions of abnormality determination in respective diagnosis methods, in accordance with the lengths of the cables 400.

For example, the abnormality determination unit 226 may determine that an abnormality occurs in a case where an evaluation value such as a peak value or an effective value continuously exceeds an abnormality threshold value by a predetermined number of times, and may set, in a case where a cable length is equal to or greater than a length threshold value, the predetermined number of times to a large value compared with a case where the cable length is smaller than the length threshold value. For example, in a case where the cable length is smaller than the length threshold value, the predetermined number of times may be set to 1, and in a case where the cable length is equal to or greater than the length threshold value, the predetermined number of times may be set to 3. Further, in both cases, the predetermined number of times may be set to be plural. For example, in a case where the cable length is smaller than the length threshold value, the predetermined number of times may be set to 2, and in a case where the cable length is equal to or greater than the length threshold value, the predetermined number of times may be set to 5. There is a case where a large peak value or the like is detected due to the influence of noise, but according to this modification example, it is possible to prevent erroneous determination due to the influence of noise.

Further, for example, instead of performing a correction process in the second pre-processing unit 224, an abnormality threshold value in abnormality determination in the abnormality determination unit 226 may be adjusted. That is, in a case where the cable length is equal to or greater than the length threshold value, the abnormality threshold value may be set to a small value compared with a case where the cable length is smaller than the length threshold value.

Modification Example 3

Although particularly not mentioned in the embodiments and the above-described modification examples, the first pre-processing unit 222, the second pre-processing unit 224, and the abnormality determination unit 226 may perform different processes with respect to vibration information in accordance with at least one of the diameters or the types of the cables 400.

For example, the first pre-processing unit 222, the second pre-processing unit 224, and the abnormality determination unit 226 may perform different processes with respect to vibration information between a case where the diameter of the cable 400 is equal to or greater than a predetermined threshold value and a case where the diameter of the cable 400 is smaller than the predetermined threshold value. As the cable diameter becomes smaller, a signal easily attenuates, and thus, a case where the cable diameter is small may be handled in a similar way to a case where the cable length is long.

Further, for example, the first pre-processing unit 222, the second pre-processing unit 224, and the abnormality determination unit 226 may perform different processes with respect to vibration information between a case where a cable 400 of a larger electrical resistance is employed and a case where a cable 400 of a smaller electric resistance is employed. As the electrical resistance becomes larger, a signal easily attenuates, and thus, a case where the cable 400 of the large electrical resistance is employed may be handled in a similar way to a case where the cable length is long.

Modification Example 4

In the embodiments and the above-described modification examples, a case where the first pre-processing unit 222, the second pre-processing unit 224, and the abnormality determination unit 226 perform different processes with respect to vibration information between a case where the cable 400 is relatively long and a case where the cable 400 is relatively short has been described, but the invention is not limited thereto. The first pre-processing unit 222, the second pre-processing unit 224, and the abnormality determination unit 226 may perform different processes between a case where a cable length is shorter than a first length threshold value, a case where the cable length is equal to or greater than the first length threshold value and is smaller than a second length threshold value (that is greater than the first length threshold value), and a case where the cable length is larger than the second length threshold value, that is, between a case where the cable length is relatively short, a case where the cable length is medium, and a case where the cable length is relatively long. Furthermore, the cable lengths may be classified into four or more stages, and different processes may be performed between the respective cases.

Further, for example, the second pre-processing unit 224 may estimate attenuation of vibration information on the basis of the length of the cable 400, and may change an amplification gain in accordance with the attenuation. For example, a value calculated by a predetermined formula in which the length of the cable 400 is a variable may be set as the estimated attenuation.

Modification Example 5

In the modification examples of the embodiments, a case where specific numerical values are set for cable lengths has been described, but the invention is not limited thereto, and for example, characters or character strings indicating the degrees of lengths may be set. For example, instead of setting the specific numerical values for the cable lengths, "long", "medium", and "short" may be set. In this case, the first pre-processing unit 222, the second pre-processing unit 224, and the abnormality determination unit 226 may perform different processes with respect to vibration information between a case where "long" is set for the cable length, a case where "medium" is set for the cable length, and a case where "short" is set for the cable length.

Modification Example 6

In the embodiments, a case where a facility layout is created in the facility layout setting screen 560 has been described, but the invention is not limited thereto.

Figure 14:
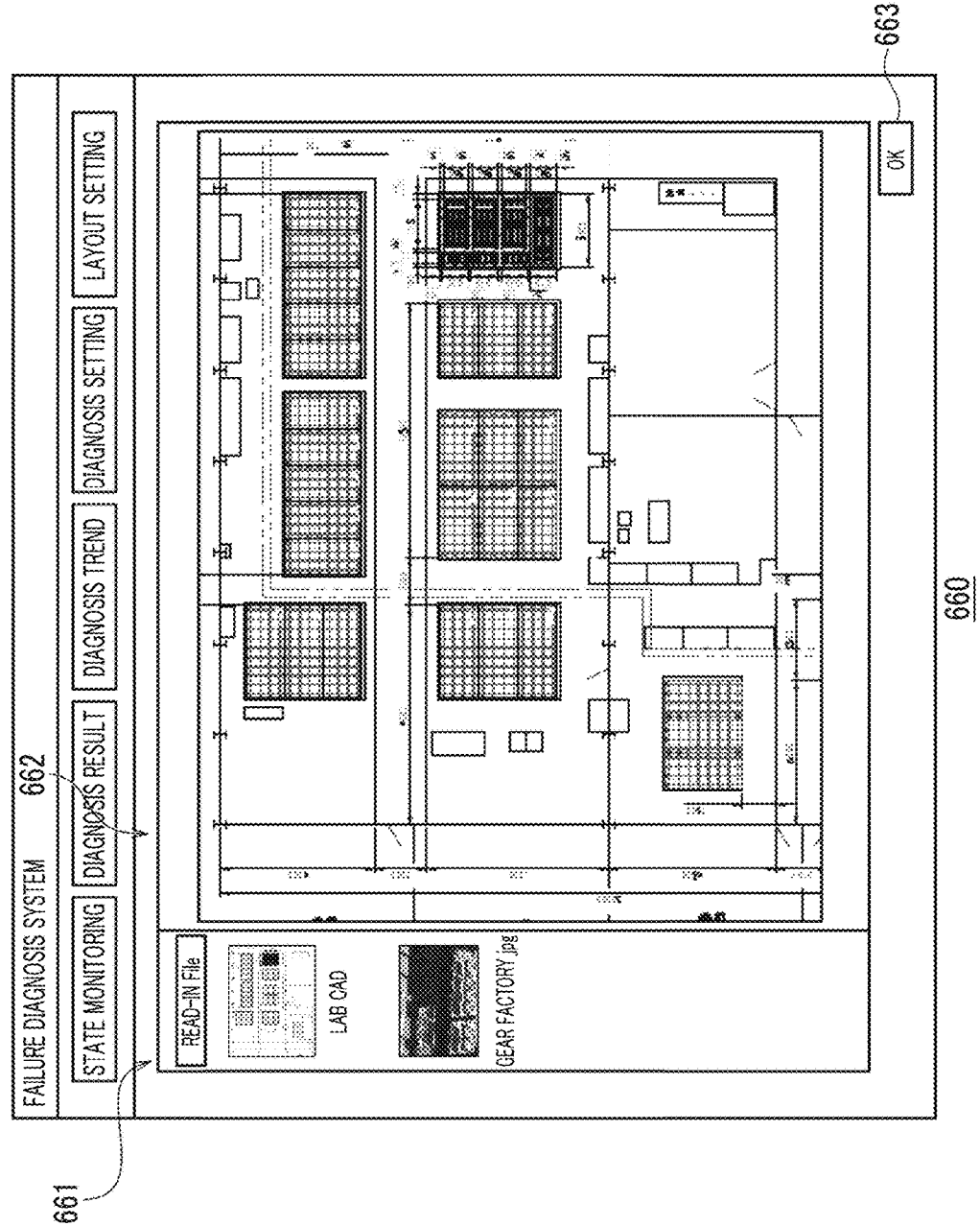
FIG. 14 is a diagram showing a facility layout setting screen according to a modification example.

FIG. 14 shows a facility layout setting screen 660 according to a modification example. The facility layout setting screen 660 includes a read-in file region 661 and a facility layout display region 662. In the read-in file region 661, a list of files of facility layout diagrams read by the terminal device 300 is displayed as a thumbnail. The files represent CAD data or image data such as JPEG, for example. In a case where a file of a facility layout diagram that is displayed as a thumbnail in the read-in file region 661 is selected, the selected image file is displayed in the facility layout display region 662. In a case where an OK button 663 is pressed, the layout acquisition unit 315 acquires the selected facility layout diagram. The layout setting unit 316 records the facility layout diagram acquired by the layout acquisition unit 315 as layout information in the layout holding unit 330.

According to this modification example, since it is not necessary to create a facility layout, the burden of a user is reduced.

Modification Example 7

In the embodiments, a case where the cable lengths of the cables 400 are set in the diagnosis setting screen 500 has been described, but the invention is not limited thereto. For example, cable images indicating the cables 400 may be drawn in a form of resembling actual routes in a disposition setting screen, and the cable length may be estimated and set on the basis of the length of the cable image.

Figure 15:
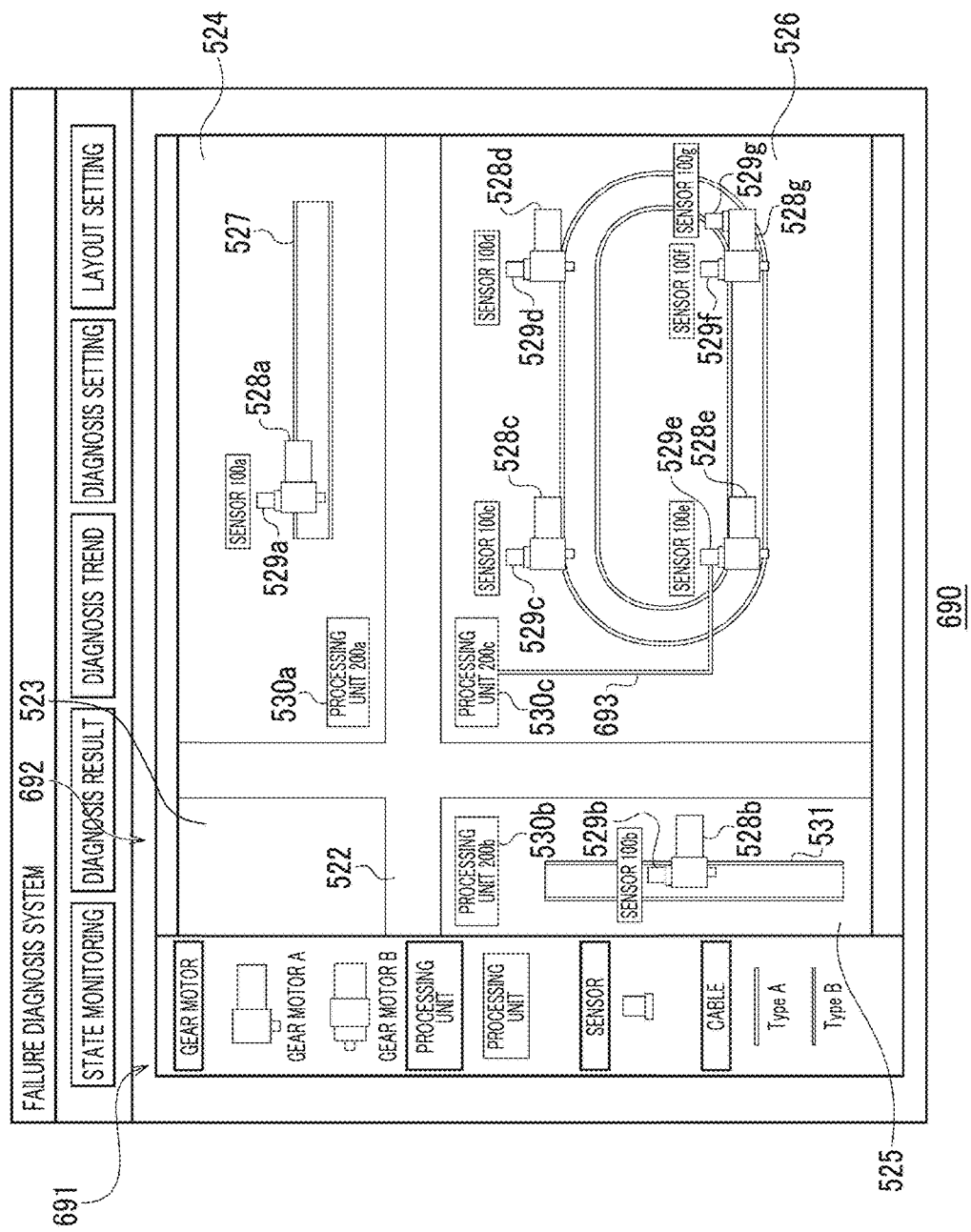
FIG. 15 is a diagram showing a disposition setting screen according to a modification example.

FIG. 15 shows a disposition setting screen 690 according to a modification example. The disposition setting screen 690 includes a part selection region 691 and a disposition setting region 692. In this modification example, a cable image is included in the part selection region 691 as a selectable image. A certain cable image is selected in the part selection region 691, and a cable image 693 is drawn to connect a processing unit image 530 and a sensor image 529 through a predetermined mouse operation or the like.

The data processing unit 306 of the terminal device 300 may further include a cable length calculation unit. The cable length calculation unit acquires scale information input from a user through the U/I unit 304, and calculates a cable length of a cable 400 on the basis of the scale information and the length of the cable image. The diagnosis setting information transmission unit 314 transmits the calculated cable length to the processing unit 200.

According to this modification example, since a cable length is calculated and set only by drawing a cable image, the burden of a user is reduced.

Modification Example 8

Although particularly not mentioned in the embodiments and the above-described modification example, the abnormality determination unit 226 of the processing unit 200 may perform abnormality determination in accordance with threshold values of plural stages. The abnormality determination unit 216 may perform abnormality determination in accordance with an abnormality threshold value and an attention threshold value (that is smaller than the abnormality threshold value), for example. By providing the attention threshold value that is a value smaller than the abnormality threshold value, it is possible to detect indication of an abnormality at an early stage.

Modification Example 9

The gear motor images 528 and the processing unit images 530 are displayed in the disposition screen display region 521, and the sensor images 529 may not be displayed. In this case, the gear motor images 528 and sensor identification information on the sensors 100 may be associated with each other. Specifically, in a case where a gear motor image 528 is selected, a sensor association screen 580 is displayed, and the gear motor image 528 and sensor identification information may be associated with each other. The sensor association setting unit 326 may set direct association between the gear motor image 528 and the sensor identification information. Further, in the state monitoring screen 520, a gear motor image 528 associated with a sensor 100 that detects vibration information that is a basis of determination that an abnormality occurs may be displayed in a state of being identifiable from the other gear motor images 528.

Modification Example 10

In the embodiments, a case where the determination result transmission unit 218 of the processing unit 200 transmits an evaluation value together with a determination result to the terminal device 300 has been described, but the invention is not limited thereto. The determination result transmission unit 218 may periodically transmit the evaluation value at a timing different from a transmission timing of the determination result to the terminal device 300. In this case, the determination result acquisition unit 310 of the terminal device 300 may acquire the evaluation value transmitted at the timing different from the transmission timing of the determination result, and may record the evaluation value in the evaluation value holding unit 338.

Further, in the embodiments, a case where the diagnosis target information transmission unit 220 transmits diagnosis target information to the terminal device 300 in accordance with a transmission request has been described, but the invention is not limited thereto. The diagnosis target information transmission unit 220 may periodically transmit the diagnosis target information to the terminal device 300 regardless of the transmission request. In this case, the data processing unit 306 of the terminal device 300 may further include an evaluation value extraction unit that extracts an evaluation value from the diagnosis target information that is periodically transmitted and stores the evaluation value in the evaluation value holding unit 338.

Further, in the embodiments, a case where an evaluation value is held in the terminal device 300 has been described, but the invention is not limited thereto. The evaluation value may be held in the processing unit 200. In this case, in a case where an evaluation value is displayed in a pop-up form as shown in FIG. 6, or in a case where a graph based on an evaluation value is displayed as shown in FIGS. 8 and 9, the processing unit 200 may transmit the evaluation value to the terminal device 300.

Modification Example 11

The terminal device 300 may include at least a part of the functions of the processing unit 200. Further, the processing unit 200 may include at least a part of the functions of the terminal device 300.

For example, the functions of the abnormality determination unit 216, the screen display controller 312, the layout setting unit 316, the disposition setting unit 318, and the association setting unit 320 may be respectively realized by arbitrary devices. For example, all of the functions may be realized by the processing unit 200, or may be realized by the terminal device 300.

Further, for example, a part of the functions of the abnormality determination unit 216 may be realized by the processing unit 200, and the remaining functions may be realized by the terminal device 300. Specifically, the functions of the first pre-processing unit 222 and the second pre-processing unit 224 may be realized by the processing unit 200, and the functions of the abnormality determination unit 226 may be realized by the terminal device 300. In this case, the diagnosis target information transmission unit 220 may transmit vibration information that is subjected to a filtering process and a correction process in the first pre-processing unit 222 and the second pre-processing unit 224 to the terminal device 300, regardless of a transmission request.

Further, for example, the screen display controller 312, the layout setting unit 316, the disposition setting unit 318, and the association setting unit 320 may be respectively realized by different devices.

Modification Example 12

In the embodiments, a case where the failure diagnosis system 10 determines whether an abnormality occurs in the gear motor 2 on the basis of vibration that is generated in the gear motor 2 has been described, but the invention is not limited thereto. For example, the failure diagnosis system 10 may diagnose whether an abnormality occurs in the gear motor 2, on the basis at least one of motor current, temperature, or iron powder concentration of lubricating oil in the gear motor 2, instead of vibration that is generated in the gear motor 2, or in addition to the vibration that is generated in the gear motor 2. That is, instead of vibration information, or in addition to the vibration information, at least one piece of information relating to the motor current, the temperature, or the iron powder concentration of the lubricating oil may be set as diagnosis target information. This is similarly applied to a case in a diagnosis target device other than the gear motor 2 is diagnosed. That is, the failure diagnosis system 10 may use any diagnosis target information suitable for determining an abnormality of the diagnosis target device.

Any combinations of the above-described embodiments and modification examples are also useful as embodiments of the invention. New embodiments based on the combinations show combinations of respective effects of embodiments and modification examples to be combined. Further, it will be understood for those skilled in the art that functions to be achieved by respective components disclosed in claims are realized by the respective components themselves shown in the embodiments and the modification examples, or by cooperation thereof. For example, a notification unit disclosed in claims may be realized by the screen display controller 312.

It should be understood that the invention is not limited to the above-described embodiment, but may be modified into various forms on the basis of the spirit of the invention. Additionally, the modifications are included in the scope of the invention.

What is claimed is:

1. A failure diagnosis system comprising:
   a first sensor that ascertains, from a first diagnosis target device in a facility, first diagnosis target information;
   a second sensor that ascertains, from a second diagnosis target device in the facility, second diagnosis target information;
   a terminal device that causes a display unit to display, on a screen, an image of the first diagnosis target device, an image of the second diagnosis target device, and a layout of the facility; and
   a processing unit that executes a diagnosis process on the first diagnosis target information to determine an occurrence of an abnormality in the first diagnosis target device, and executes the diagnosis process on the second diagnosis target information to determine an occurrence of an abnormality in the second diagnosis target device,
   wherein when the diagnosis process determines the occurrence of the abnormality in the first diagnosis target device, the terminal device causes the display unit to display a first indicator on the screen,
   wherein when the diagnosis process determines the occurrence of the abnormality in the second diagnosis target device, the terminal device causes the display unit to display a second indicator on the screen,
   wherein the terminal device causes the display unit to display a setting screen to create a facility layout and set disposition of the first diagnosis target device and the second diagnosis target device in the facility layout,
   wherein the terminal device causes the display unit to display, on the setting screen, a part region, in which a part image of the facility is displayed, and a facility layout display region, and create the facility layout by receiving an operation of disposing, in the facility layout display region, the part image displayed in the part region,
   wherein the terminal device receives an operation of disposing images of the first diagnosis target device and the second diagnosis target device in the created facility layout on the setting screen,
   wherein the image of the first diagnosis target device depicts, on the screen, a location in the layout where the first diagnosis target device is sited, and
   wherein the image of the second diagnosis target device depicts, on the screen, a location in the layout where the second diagnosis target device is sited.

2. The failure diagnosis system according to claim 1, wherein the terminal device causes the display unit to display, on the screen, a sensor image of the first sensor.

3. The failure diagnosis system according to claim 2, wherein the sensor image of the first sensor depicts, on the screen, a location in the layout where the first sensor is sited.

4. The failure diagnosis system according to claim 2, wherein the terminal device causes the display unit to display, on the screen, detailed information pertaining to the first diagnosis target information when a cursor on the screen selects the sensor image of the first sensor.

5. The failure diagnosis system according to claim 2, wherein the first indicator is a color change of the sensor image of the first sensor.

6. The failure diagnosis system according to claim 1, wherein the first indicator is a color change of the image of the first diagnosis target device.

7. The failure diagnosis system according to claim 1, wherein the terminal device causes the display unit to display, on the screen, detailed information pertaining to the first diagnosis target information when a cursor on the screen selects the image of the first diagnosis target device.

8. The failure diagnosis system according to claim 1, wherein the second indicator is a color change of the image of the second diagnosis target device.

9. The failure diagnosis system according to claim 8, wherein the terminal device causes the display unit to display, on the screen, the sensor image of the second sensor in the layout.

10. The failure diagnosis system according to claim 8, wherein the sensor image of the second sensor depicts, on the screen, a location in the layout where the second sensor is sited.

11. The failure diagnosis system according to claim 1, further comprising:
    a layout acquisition unit that acquires a facility layout drawing and sets the facility layout drawing as the layout.

12. The failure diagnosis system according to claim 1, wherein the processing unit executes different processes on the first diagnosis target information and the second diagnosis target information in accordance with a difference between an interconnect distance between the processing unit and the first sensor and an interconnect distance between the processing unit and the second sensor.

13. The failure diagnosis system according to claim 12, wherein the processing unit executes different filtering processes on the first diagnosis target information and the second diagnosis target information.

14. The failure diagnosis system according to claim 12, wherein the processing unit executes different correction processes on the first diagnosis target information and the second diagnosis target information.

15. The failure diagnosis system according to claim 1, wherein, when the occurrence of the abnormality in the first diagnosis target device is determined, the terminal device causes the display unit to display that an abnormality of the processing unit to which the first sensor is connected also occurs.

* * * * *